United States Patent [19]
Belsan et al.

[11] Patent Number: 5,581,724
[45] Date of Patent: Dec. 3, 1996

[54] DYNAMICALLY MAPPED DATA STORAGE SUBSYSTEM HAVING MULTIPLE OPEN DESTAGE CYLINDERS AND METHOD OF MANAGING THAT SUBSYSTEM

[75] Inventors: Jay S. Belsan, Nederland; George A. Rudeseal, Boulder; Charles A. Milligan, Golden, all of Colo.

[73] Assignee: Storage Technology Corporation, Louisville, Colo.

[21] Appl. No.: 439,665

[22] Filed: May 12, 1995

Related U.S. Application Data

[63] Continuation of Ser. No. 963,052, Oct. 19, 1992, abandoned.

[51] Int. Cl.$^6$ .......................... G06F 12/00; G06F 12/16; G06F 11/08
[52] U.S. Cl. ................. 395/441; 395/440; 395/480; 395/488; 395/182.04; 364/DIG. 1; 364/246.6; 364/285; 364/243.41; 364/943.91; 364/944.2; 364/944.92; 364/964.2; 364/966.5
[58] Field of Search ..................... 395/438, 439, 395/440, 441, 600, 182.04, 182.05, 182.03, 183.18, 488, 489, 480, 497.04, 456

[56] References Cited

U.S. PATENT DOCUMENTS

| | | | |
|---|---|---|---|
| 4,536,837 | 8/1985 | Olson et al. | 395/600 |
| 4,775,932 | 10/1988 | Oxley et al. | 395/600 |
| 5,077,736 | 12/1991 | Dunphy, Jr. et al. | 395/182.05 |
| 5,124,987 | 6/1992 | Milligan et al. | 395/182.05 |
| 5,155,835 | 10/1992 | Belsan | 395/441 |
| 5,239,659 | 8/1993 | Rudeseal et al. | 395/182.05 |
| 5,247,638 | 9/1993 | O'Brien et al. | 395/888 |
| 5,313,626 | 5/1994 | Jones et al. | 395/182.03 |

*Primary Examiner*—Glenn Gossage
*Attorney, Agent, or Firm*—Duft, Graziano & Forest, P.C.

[57] ABSTRACT

A data storage subsystem dynamically maps a virtual data storage device image presented to associated processors to physical data storage devices used to implement the data storage subsystem. Multiple destage memory elements are concurrently active to increase an aggregate destage data transfer rate and to allow data to be stored on various memory elements appropriate to the type of data contained in each stored virtual object. An open logical cylinder list is used to maintain data integrity among multiple open destage memory elements. Memory elements are also selected to function as archive memory. The data storage subsystem includes a plurality of data storage elements configured into at least two redundancy groups, each redundancy group including n+m of the data storage elements, and a cache memory connected to the redundancy groups and a host processor interface. The data storage subsystem stores data indicative of the amount of available memory space on each of the open logical cylinders and little used data records are migrated or transferred from other memory elements to the archive memory elements to maintain sufficient available memory space.

20 Claims, 15 Drawing Sheets

DYNAMICALLY MAPPED DATA STORAGE SUBSYSTEM HAVING MULTIPLE OPEN DESTAGE CYLINDERS AND METHOD OF MANAGING THAT SUBSYSTEM

This application is a file wrapper continuation of application Ser. No. 07/963,052, filed Oct. 19, 1992, now abandoned.

CROSS REFERENCE TO RELATED APPLICATIONS

This application is related to U.S. patent application Ser. No. 07/509,484 filed Apr. 16, 1990 and titled "Logical Track Write Scheduling System for a Parallel Disk Drive Array Data Storage Subsystem", now U.S. Pat. No. 5,124,987, issued Jun. 23, 1992.

FIELD OF THE INVENTION

This invention relates to data storage subsystems and, in particular, to memory control apparatus for a disk drive array data storage subsystem employing a log-structured storage management approach that maintains data integrity while writing data to multiple open destage cylinders on the disk drives.

PROBLEM

It is a problem in log-structured storage Systems that due to a single write cursor, throughput is limited and data storage media data differentiation is not possible. Data storage subsystems provide on-line data storage capability for a plurality of host processors. The time required to access the data stored on disk drives in the data storage subsystem is relatively slow compared to the processing time of the associated host processors. In order to minimize the host processor access time to data, the data storage subsystem is typically equipped with a cache memory that serves as a high speed data storage buffer between the disk drive data storage devices of the data storage subsystem and the host processors.

One type of data storage subsystem uses an array containing a plurality of disk drives, configured into a plurality of redundancy groups, to store data records for the host processor. This disk drive array data storage subsystem uses mapping tables to control the allocation and management of space on the physical disk drive devices and to translate between the physical devices within a redundancy group and the virtual device image presented to the host processor. In this system, it is a problem to ensure that the mapping information can be precisely reconstructed if the mapping tables are corrupted. Another problem with this log-structured model is that a single write cursor imposes a rigid storage management requirement on the allocation of space in a redundancy group to store data records received from the host processor. There is no capability to write different types of data contained in the stream of data records received from the host processor in data storage locations and on media that have different data retrieval characteristics. In addition, the use of a single active logical cylinder in a single redundancy group of the disk drive array is inefficient in a data storage subsystem that is equipped with a plurality of redundancy groups and possibly a plurality of disk drive arrays.

SOLUTION

The above described problems are solved and a technical advance achieved in the field by the memory management system of the present invention that maintains data integrity while managing multiple open destage cylinders/tracks as part of the data write activity of the associated host processors. The memory management system operates in a dynamically mapped data storage subsystem which includes a disk drive array. The disk drive array comprises a plurality of data storage devices (disk drives) that may be switchably interconnected to form redundancy groups, each of which contains n+m data storage devices for storing data and associated redundancy information. Data received from the associated host processors is stored in a cache memory, segmented by the data storage subsystem, redundancy data is generated for error detection and correction purposes and the resultant data is written (destaged) to the n+m data storage devices of a redundancy group.

This data storage subsystem maintains mapping tables indicative of the mapping that takes place between the virtual device image as seen by the host processors and the actual physical devices on which the data is stored. Furthermore, in order to improve the performance of the data storage subsystem, data that is modified by a host processor is not rewritten in its original storage location, since this would entail updating the redundancy data that is stored along with the data received from the associated data processor in the redundancy group. Instead, the modified data is written to a new available cylinder in the data storage subsystem and the original data storage location that contained the data is flagged as containing obsolete data. Therefore, the data storage subsystem maintains a significant amount of control information relevant to the location and access activity of each virtual data object stored in the data storage subsystem.

This virtual data object activity information is used by the memory management system to manage multiple open destage memory elements during data write activity. The open destage memory element can be selected cylinders/tracks on a single disk drive/redundancy group or selected cylinders/tracks on multiple disk drives/redundancy groups. An open logical cylinder list is maintained to denote the open/closed status of each logical cylinder in the disk drive array. This enables the memory management system to schedule data write activity to a number of concurrently open logical cylinders. Preserving data integrity while accomplishing this function requires the concurrent management of multiple processes to ensure that the mapping table updates accurately reflect the present state of the data stored in the data storage subsystem. The use of multiple open destage memory elements increases the aggregate destage data transfer rate and also enables the data storage subsystem to differentiate data during the destage process. The data can be destaged to active memory elements that are appropriate for the type of data contained in each stored virtual data object. As data is scheduled to be destaged to disk drives, the disk drive selected to store this particular data can be designated on the basis of data administration characteristics, such as read only, duplex copy group, low read/write activity, etc. The use of an open logical cylinder list also provides a mechanism to prevent data, from being inadvertently invalidated during mapping table reconstruction.

DETAILED DESCRIPTION OF THE INVENTION

Figure 1:
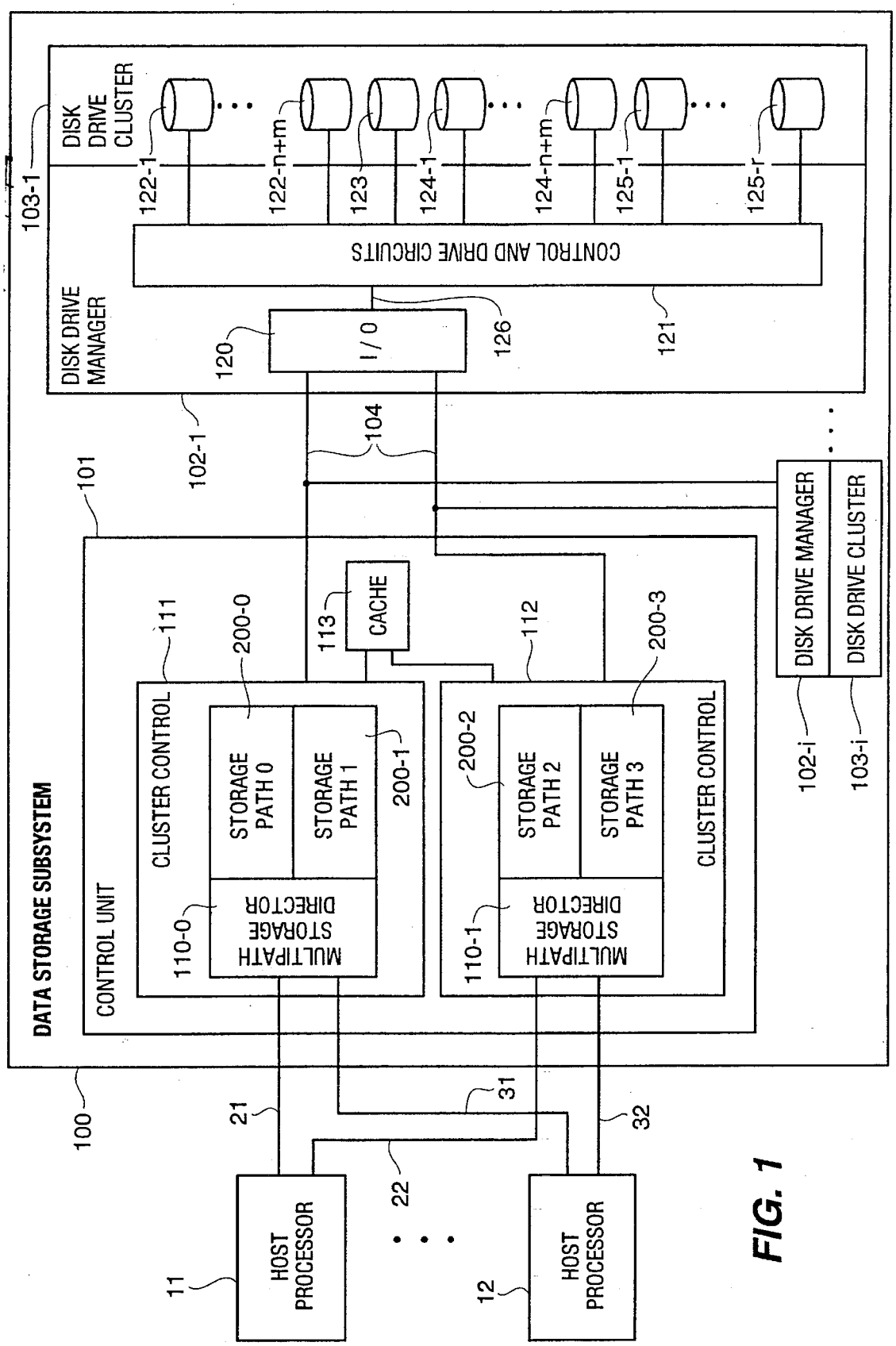
FIG. 1 illustrates in block diagram form the architecture of the disk drive array data storage subsystem.

The data storage subsystem of the present invention uses a plurality of small form factor disk drives in place of a single large form factor disk drive to implement an inexpensive, high performance, high reliability disk drive memory that emulates the format and capability of large form factor disk drives. This system avoids the parity update problem of the prior art disk drive array systems by never updating the redundancy data in a redundancy group. Instead, all new or modified data is written on empty logical tracks and the old data in the redundancy group is tagged as obsolete. The resultant "holes" in the logical tracks caused by old data are removed by a background free-space collection process that creates empty logical tracks by collecting valid data into previously emptied logical tracks.

The disk drive array data storage subsystem includes a data storage management system that provides improved data storage and retrieval performance by dynamically mapping between virtual and physical data storage devices. The disk drive array data storage subsystem consists of three abstract layers: virtual, logical and physical. The virtual layer functions as a conventional large form factor disk drive memory. The logical layer functions as an array of storage units that are grouped into a plurality of redundancy groups, each containing N+M physical disk drives. The physical layer functions as a plurality of individual small form factor disk drives. The data storage management system operates to effectuate the dynamic mapping of data among these abstract layers and to control the allocation and management of the actual space on the physical devices. These data storage management functions are performed in a manner that renders the operation of the disk drive array data storage subsystem transparent to the host processor which perceives only the virtual image of the disk drive array data storage subsystem.

The performance of this system is enhanced by the use of a cache memory with both volatile and non-volatile portions and "backend" data staging and destaging processes. Data received from the host processors is stored in the cache memory in the form of modifications to data already stored in the redundancy groups of the data storage subsystem. No data stored in a redundancy group is modified. A virtual track is staged from a redundancy group into cache memory. The host processor then modifies some, perhaps all, of the records on the virtual track. Then, as determined by cache replacement algorithms, such as least recently used, (LRV), etc., the modified virtual track is selected to be destaged to disk drives in a selected redundancy group. When thus selected, a virtual track is divided (marked off) into several physical sectors to be stored on one or more physical tracks of one or more logical tracks. A complete physical track may contain physical sectors from one or more virtual tracks. Each physical track is combined with N-1 other physical tracks to form the N data segments of a logical track.

The original, unmodified data is simply flagged as obsolete. Obviously, as data is modified, the redundancy groups contain numerous virtual tracks of obsolete data. The valid virtual tracks in a logical cylinder are read to the cache memory in a background "free space collection" process. They are then written to a previously emptied logical cylinder and the "collected" logical cylinder is tagged as being empty. Thus, all redundancy data creation, writing and free space collection occurs in background, rather than on-demand processes. This arrangement avoids the parity update problem of existing disk drive array systems and improves the response time versus access rate performance of the data storage subsystem by transferring these overhead tasks to background processes.

In this dynamically mapped data storage subsystem, data destage memory elements can be selected cylinders/tracks on a single disk drive/redundancy group or selected cylinders/tracks on multiple disk drives/redundancy groups. Typically, a plurality of logical cylinders are concurrently open, in that they are used for writing a received stream of data records, each of which is directed to selected ones of the logical cylinders, typically as a function of administrative characteristics of the data. The use of multiple destage memory elements increases the data transfer rate and enables the data storage subsystem to differentiate data during the destage process. The data can be destaged to active memory elements that are appropriate for the type of data contained in each data object. In order to maintain data integrity in the data storage subsystem, the disclosed method and apparatus controls the updating of data in the virtual track directory, the logical cylinder directories, and the non-volatile journals. There are a number of concurrently operational processes: destaging, free space collection, delete data set, and instant copy, that can affect the integrity of the data written onto an open logical cylinder. A new data structure, known as the open logical cylinder list, consists of a circular list that documents all of the active logical cylinders in the data storage subsystem. Each logical cylinder included in this list has associated therewith data indicative of its present status. Therefore, open destage cylinders are noted as well as closed logical cylinders. Using this data structure, and associated control structures in the various data write and management subroutines, enables the present data storage subsystem to maintain a plurality of open logical cylinders and yet maintain the integrity of the data contained therein.

Data Storage Subsystem Architecture

FIG. 1 illustrates in block diagram form the architecture of the preferred embodiment of the disk drive array data storage subsystem 100. The disk drive array data storage subsystem 100 appears to the associated host processors 11 and 12 to be a collection of large form factor disk drives with their associated storage control, since the architecture of disk drive array data storage subsystem 100 is transparent to the associated host processors 11 and 12. This disk drive array data storage subsystem 100 includes a plurality of disk drives (for example, 122-1 to 125-r) located in a plurality of disk clusters 103-1 to 103-i. The disk drives 122-1 to 125-r are significantly less expensive, even with providing disk drives to store redundancy information and providing disk drives for backup purposes, than the typical 14 inch form factor disk drive with an associated backup disk drive. The plurality of disk drives 122-1 to 125-r are typically the commodity hard disk drives in the 5¼ inch form factor.

The architecture illustrated in FIG. 1 is that of a plurality of host processors 11 and 12 interconnected via the respective plurality of data channels 21, 22–31, 32, respectively to a data storage subsystem 100 that provides the backend data storage capacity for the host processors 11–12. This basic configuration is well known in the data processing art. The data storage subsystem 100 includes a control unit 101 that serves to interconnect the clusters of disk drives 103-1 to 103-i and their associated drive managers 102-1 to 102-i with the data channels 21–22, 31–32 that interconnect data storage subsystem 100 with the plurality of host processors 11, 12.

Control unit 101 includes typically two cluster controls 111, 112 for redundancy purposes. Within a cluster control 111 the multipath storage director 110-0 provides a hardware interface to interconnect data channels 21, 31 to cluster control 111 contained in control unit 101. In this respect, the multipath storage director 110-0 provides a hardware interface to the associated data channels 21, 31 and provides a multiplex function to enable any attached data channel (for example, 21) from any host processor (for example, 11) to interconnect to a selected cluster control 111 within control unit 101. The cluster control 111 itself provides a pair of storage paths 201-0, 201-1 which function as an interface to a plurality of optical fiber backend channels 104. In addition, the cluster control 111 includes a data compression function as well as a data routing function that enables cluster control 111 to direct the transfer of data between a selected data channel 21 and cache memory 113, and between cache memory 113 and one of the connected optical fiber backend channels 104. Control unit 101 provides the major data storage subsystem control functions that include the creation and regulation of data redundancy groups, reconstruction of data for a failed disk drive, switching a spare disk drive in place of a failed disk drive, data redundancy generation, logical device space management, and virtual to logical device mapping. These subsystem functions are discussed in further detail below.

Disk drive manager 102-1 interconnects the plurality of commodity disk drives 122-1 to 125-r included in disk drive array cluster 103-1 with the plurality of optical fiber backend channels 104. Disk drive manager 102-1 includes an input/output circuit 120 that provides a hardware interface to interconnect the optical fiber channels 104 with the data paths 126 that serve control and drive circuits 121. Control and drive circuits 121 receive the data on conductors 126 from input/output circuit 120 and convert the form and format of these signals as required by the associated commodity disk drives in disk drive array cluster 103-1. In addition, control and drive circuits 121 provide a control signalling interface to transfer signals between the disk drive array cluster 103-1 and control unit 101.

The data that is written onto the disk drives in disk drive array cluster 103-1 consists of data that is transmitted from an associated host processor 11 over data channel 21 to one of cluster controls 111, 112 in control unit 101. The data is written into, for example, cluster control 111 which stores the data in cache 113. Cluster control 111 stores N physical tracks of data in cache 113 and then generates M redundancy segments for error correction purposes. Cluster control 111 then selects a subset of disk drives (122-1 to 122-n+m) to form a redundancy group to store the received data. Cluster control 111 selects an empty logical track, consisting of N+M physical tracks, in the selected redundancy group. Each of the N physical tracks of the data are written onto one of N disk drives in the selected data redundancy group. An additional M disk drives are used in the redundancy group to store the M redundancy segments. The M redundancy segments include error correction characters and data that can be used to verify the integrity of the N physical tracks that are stored on the N disk drives as well as to reconstruct one or more of the N physical tracks of the data if that physical track were lost due to a failure of the disk drive on which that physical track is stored.

Thus, data storage subsystem 100 can emulate one or more large form factor disk drives (for example, an IBM 3380 type of disk drive) using a plurality of smaller form factor disk drives while providing a high reliability capability by writing the data across a plurality of the smaller form factor disk drives. A reliability improvement is also obtained by providing a pool of R backup disk drives (125-1 to 125-r) that are switchably interconnectable in place of a failed disk drive. Data reconstruction is accomplished by the use of the M redundancy segments, so that the data stored on the remaining functioning disk drives combined with the redundancy information stored in the redundancy segments can be used by control software in control unit 101 to reconstruct the data lost when one or more of the plurality of disk drives in the redundancy group fails (122-1 to 122-n+m). This arrangement provides a reliability capability similar to that obtained by disk shadowing arrangements at a significantly reduced cost over such an arrangement.

Disk Drive

Each of the disk drives 122-1 to 125-r in disk drive array 103-1 can be considered a disk subsystem that consists of a disk drive mechanism and its surrounding control and interface circuitry. The disk drive consists of a commodity disk drive which is a commercially available hard disk drive of the type that typically is used in personal computers. A control processor associated with the disk drive has control responsibility for the entire disk drive and monitors all information routed over the various serial data channels that connect each disk drive 122-1 to 125-r to control and drive circuits 121. Any data transmitted to the disk drive over these channels is stored in a corresponding interface buffer which is connected via an associated serial data channel to a corresponding serial/parallel converter circuit. A disk controller is also provided in each disk drive to implement the low level electrical interface required by the commodity disk drive. The commodity disk drive has an ESDI interface which must be interfaced with control and drive circuits 121. The disk controller provides this function. Disk controller provides serialization and deserialization of data, CRC/ECC generation, checking and correction and NRZ data encoding. The addressing information such as the head select and other type of control signals are provided by control and drive circuits 121 to commodity disk drive 122-1. This communication path is also provided for diagnostic and control purposes. For example, control and drive circuits 121 can power a commodity disk drive down when the disk drive is in the standby mode. In this fashion, commodity disk drive remains in an idle state until it is selected by control and drive circuits 121.

Control Unit

Figure 2:
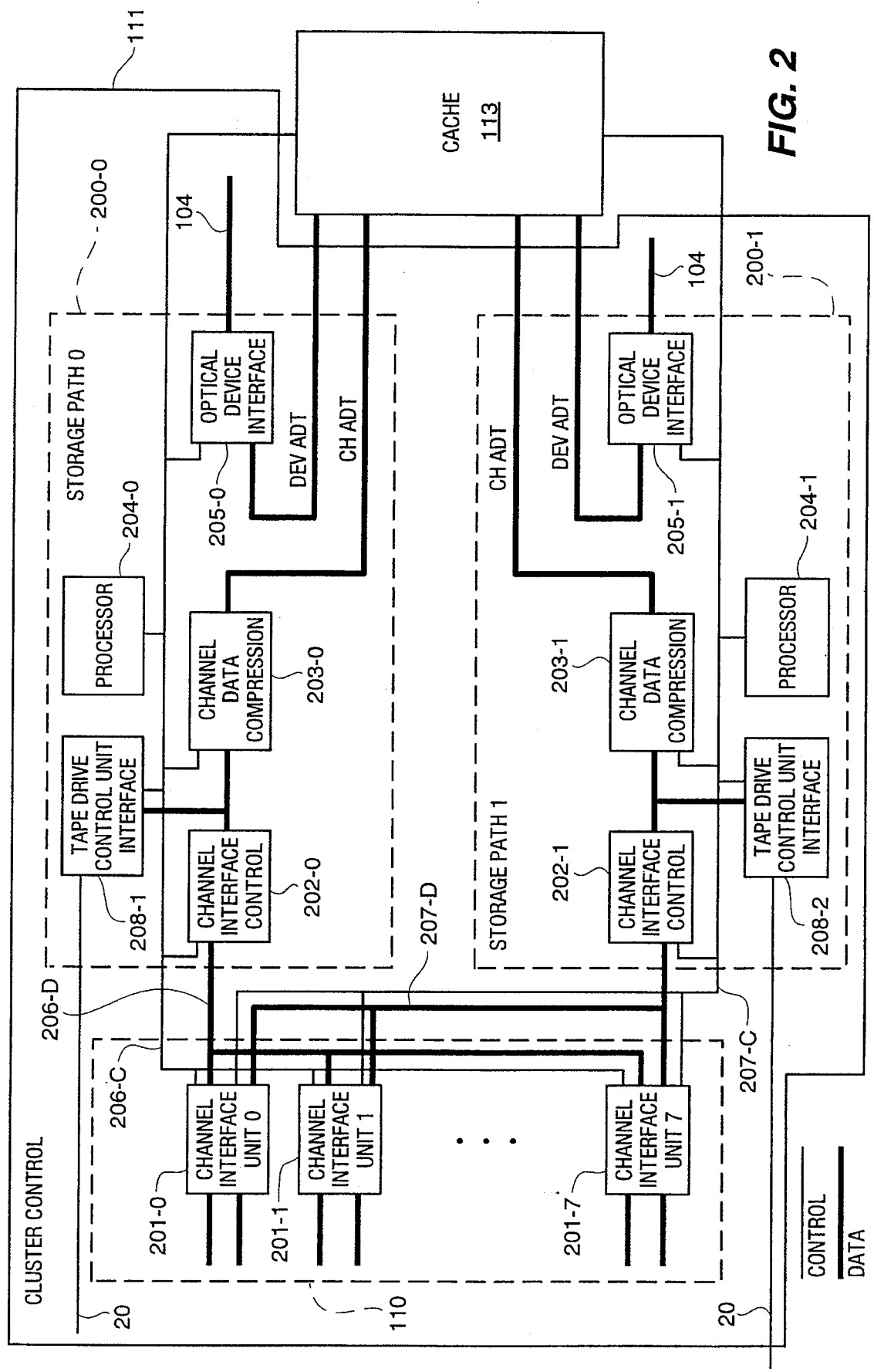
FIG. 2 illustrates the cluster control of the data storage subsystem.

FIG. 2 illustrates in block diagram form additional details of cluster control 111. Multipath storage director 110 includes a plurality of channel interface units 201-0 to 201-7, each of which terminates a corresponding pair of data channels 21, 31. The control and data signals received by the corresponding channel interface unit 201-0 are output on either of the corresponding control and data buses 206-C, 206-D, respectively, to either storage path 200-0 or storage path 200-1. Thus, as can be seen from the structure of the cluster control 111 illustrated in FIG. 2, there is a significant amount of symmetry contained therein. Storage path 200-0 is identical to storage path 200-1 and only one of these is described herein. The multipath storage director 110 uses two sets of data and control busses 206-D, C and 207-D, C to interconnect each channel interface unit 201-0 to 201-7 with both storage path 200-0 and 200-1 so that the corresponding data channel 21 from the associated host processor 11 can be switched via either storage path 200-0 or 200-1 to the plurality of optical fiber backend channels 104. Within storage path 200-0 is contained a processor 204-0 that regulates the operation of storage path 200-0. In addition, an optical device interface 205-0 is provided to convert between the optical fiber signalling format of optical fiber backend channels 104 and the metallic conductors contained within storage path 200-0. Channel interface control 202-0 operates under control of processor 204-0 to control the flow of data to and from cache memory 113 and the channel interface units 201 that is presently active within storage path 200-0. The channel interface control 202-0 includes a cyclic redundancy check (CRC) generator/checker to generate and check the CRC bytes for the received data. The channel interface circuit 202-0 also includes a buffer that compensates for speed mismatch between the data transmission rate of data channel 21 and the available data transfer capability of cache memory 113. The data that is received by channel interface control circuit 202-0 from a corresponding channel interface circuit 201 is forwarded to cache memory 113 via channel data compression circuit 203-0. The channel data compression circuit 203-0 provides the necessary hardware and microcode to perform compression of the channel data for control unit 101 on a data write from host processor 11. It also performs the necessary decompression operation for control unit 101 on a data read operation by host processor 11.

As can be seen from the architecture illustrated in FIG. 2, all data transfers between a host processor 11 and a redundancy group in the disk drive array cluster 103-1 are routed through cache memory 113. Control of cache memory 113 is provided in control unit 101 by processor 204-0. The functions provided by processor 204-0 include initialization of the cache directory and other cache data structures, cache directory searching and management, cache space management, cache performance improvement algorithms as well as other cache control functions. In addition, processor 204-0 creates the redundancy groups from the disk drives in disk drive array cluster 103-0 and maintains records of the status of those devices. Processor 204-0 also causes the redundancy data across the N data disks in a redundancy group to be generated within cache memory 113 and writes the M segments of redundancy data onto the M redundancy disks in the redundancy group. The functional software in processor 204-0 also manages the mappings from virtual to logical and from logical to physical devices. The tables that describe this mapping are updated, maintained, backed up and occasionally recovered by this functional software on processor 204-0. The free space collection function is also performed by processor 204-0 as well as management and scheduling of the optical fiber backend channels 104. Many of these above functions are well known in the data processing art and are not described in any detail herein.

Dynamic virtual Device to Logical Device Mapping

With respect to data transfer operations, all data transfers go through cache memory 113. Therefore, front end or channel transfer operations are completely independent of backend or device transfer operations. In this system, staging operations are similar to staging in other cached disk subsystems but destaged transfers are collected into groups for bulk transfers. In addition, this data storage subsystem 100 simultaneously performs free space collection, mapping table backup, and error recovery as background processes. Because of the complete front end/backend separation, the data storage subsystem 100 is liberated from the exacting processor timing dependencies of previous CKD disk subsystems. The subsystem is free to dedicate its processing resources to increasing performance through more intelligent scheduling and data transfer control.

The disk drive array data storage subsystem 100 consists of three abstract layers: virtual, logical and physical. The virtual layer functions as a conventional large form factor disk drive memory. The logical layer functions as an array of storage units that are grouped into a plurality of redundancy groups (for example 122-1 to 122-n+m), each containing N+M disk drives to store N physical tracks of data and M physical tracks of redundancy information for each logical track. The physical layer functions as a plurality of individual small form factor disk drives. The data storage management system operates to effectuate the mapping of data among these abstract layers and to control the allocation and management of the actual space on the physical devices. These data storage management functions are performed in a manner that renders the operation of disk drive array data storage subsystem 100 transparent to the host processors (11–12).

A redundancy group consists of N+M disk drives. The redundancy group is also called a logical volume or a logical device. Within each logical device there are a plurality of logical tracks, each of which is the set of all physical tracks in the redundancy group which have the same physical track address. These logical tracks are also organized into logical cylinders, each of which is the collection of all logical tracks within a redundancy group which can be accessed at a common logical actuator position. Disk drive array data storage subsystem 100 appears to the host processor to be a collection of large form factor disk drives, each of which contains a predetermined number of tracks of a predetermined size called a virtual track. Therefore, when host processor 11 transmits data over data channel 21 to data storage subsystem 100, the data is transmitted in the form of the individual records of a virtual track. In order to render the operation of disk drive array data storage subsystem 100 transparent to host processor 11, the received data is stored on the physical disk drives (122-1 to 122-n+m) in the form of virtual track instances which reflect the capacity of a track on the large form factor disk drive that is emulated by data storage subsystem 100. Although a virtual track instance may spill over from one physical track to the next physical track, a virtual track instance is not permitted to spill over from one logical cylinder to another. This is done in order to simplify the management of the memory space.

When a virtual track is modified by the host processor 11, the updated instance of the virtual track is not rewritten in data storage subsystem 100 at its original location but is instead written to a new logical cylinder and the previous instance of the virtual track is marked obsolete. Therefore, over time a logical cylinder becomes riddled with "holes" of obsolete data known as free space. In order to create whole free logical cylinders, virtual track instances that are still valid and located among fragmented free space within a logical cylinder are relocated within disk drive array data storage subsystem 100 in order to create entirely free logical cylinders. In order to evenly distribute data transfer activity, the tracks of each virtual device are scattered as uniformly as possible among the logical devices in disk drive array data storage subsystem 100. In addition, virtual track instances are padded out if necessary to fit into an integral number of physical device sectors. This is to ensure that each virtual track instance starts on a sector boundary of the physical device.

Mapping Tables

Figure 9:
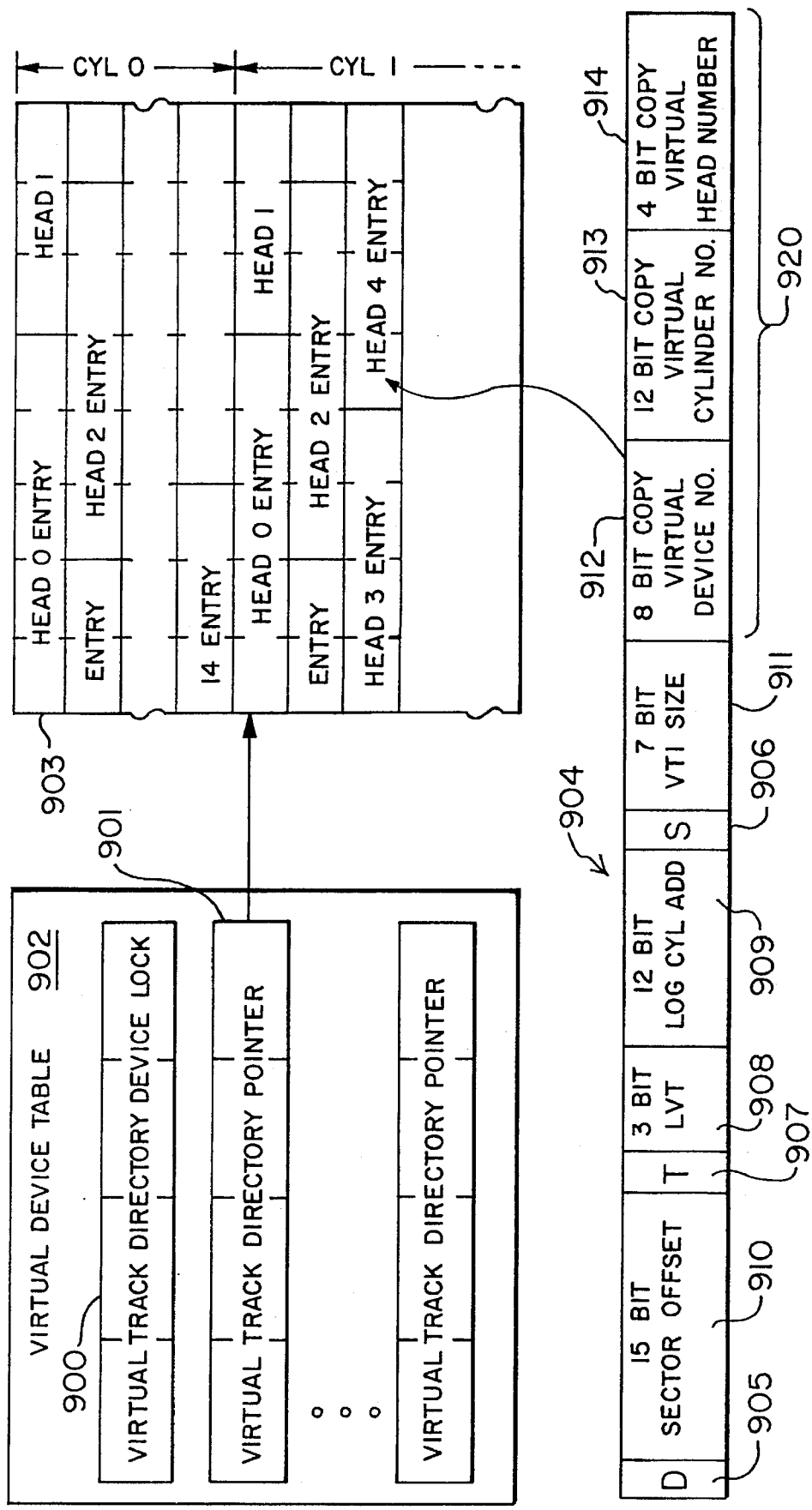
FIG. 9 illustrates the data structures making up the virtual track directory including structures in a typical virtual device table, a typical virtual track directory cache segment, and a typical virtual track directory entry.

It is necessary to accurately record the location of all data within disk drive array data storage subsystem 100 since the data received from host processors 11–12 is mapped from its address in the processor-defined virtual space to a physical location in data storage subsystem 100 in a dynamic fashion. A virtual track directory 903 (FIG. 9) is maintained to recall the location of the current instance of each virtual track in disk drive array data storage subsystem 100. The virtual track directory 903 consists of an entry 904 for each virtual track which the associated host processor 11 can address. The virtual track directory 903 is stored in noncontiguous pieces of cache memory 113 and is addressed indirectly through pointers 901 in a virtual device table 902. The virtual track directory 903 is updated whenever a new virtual track instance is written to the disk drives. Each entry 904 in the virtual track directory 903 is for a single track and is addressed by the virtual track address. Each entry 904 in this table is typically 64 bits long and contains a number of fields. One of these fields is the deleted bit field 905 which indicates whether this virtual track is presently valid or whether it is invalid because it has either not been written or was subsequently unwritten. A second field in the table entry is the source bit 906 which indicates, when set, that this virtual track has been the source of a copy operation and the copy virtual device, cylinder and head fields in this virtual track directory entry point to a virtual address that contains the same data as that located in this virtual track. This virtual address pointed to by this virtual track directory entry is stored in the virtual track instance entry in this table that is pointed to by this particular virtual track directory entry. A third field in the table entry is the target bit 907 which, when set, indicates that this virtual track is the destination of a copy operation and the copy virtual device, cylinder and head fields in the virtual track directory entry point to a virtual address that contains the same data as this virtual track. The fourth and fifth fields in this table entry are the logical volume number 908 and logical cylinder address 909 respectively. These entries contain data corresponding to the logical volume table and physical cylinder number, respectively. A sixth field in this table entry is the sector offset field 910 which contains data indicative of the offset to the start of the virtual track instance in the logical cylinder. This offset does not include redundancy track sectors. The seventh field in the table entry is the virtual track instance size 911 which contains data indicative of the number of sectors that were used to store the virtual track.

Virtual Track Director Copy

This method of managing the data pointers makes use of an expanded virtual track directory 903 which increases each entry 904 to allow room for a virtual track address 920 that consists of copy virtual device number 912, copy virtual cylinder number 913 and copy virtual head number 914 elements which act as a pointer to another virtual track that was copied from the first virtual track. The virtual track directory entry for the track pointed to from the first virtual track directory entry contains the same logical address as the first and contains the virtual track address of the next virtual track directory entry in the chain of target data records. Thus, multiple tracks copied from a single source track are identified by a singly linked list that loops back to itself at the source track to form a synonym ring of pointers. Thus, the virtual track directory itself contains an embedded copy table instead of using the lookaside copy table described above. Theoretically, any number of copies of a single track can be made using this method since the virtual track directory entries are simply linked together in ring form. As a management construct, the number of copies can be limited to a predetermined number and, if a user requests further copies to be made, a second set of copies can be created by staging the data record from the backend data storage devices to make a second physical copy in cache memory 113 which can be used as the basis of a second ring in order to enable the length of each ring to be maintained at a reasonable manageable number.

The operation of the virtual track directory implementation is illustrated in flow diagram form in FIG. 17. At step 1701, the data storage subsystem receives a copy request from host processor 11 over data channel 21. Processor 204-0 in data storage subsystem 100 verifies at step 1702 that the extents are defined, the same length and do not overlap. The cache management software ensures at step 1703 that all the tracks in this target extent are cleared and available for the copy operation. This is explained in further detail in the following pseudo code:

```
For each track in source extent, search cache
    IF track is found
        Mark track as 'Copy Loop Track'
        IF track is modified
            CALL Copy Modified Track service routine
                PASS Source Virtual Track Address
                PASS Target Virtual Track Address
            ;*  Function forms Copy Loop in VTD and
            ;*  marks target as 'No Backend Address'
            ;*  IF Copy Loop is below Max Size
            ;*      RETURN (SUCCESS) ;* No Action
                        Necessary
            ;*  ELSE (Loop too big - Need to Break
                        Mark Target as Pseudosource in
                            VTD
                            Entry
            ;*      RETURN (Cache Copy to Target
                            Address and Destage Target)
            ;*  ENDIF
            RECEIVE Status
            ;*  Cache must do the following:
            ;*  IF status is Cache Copy to Target and
                    Destage Target
            ;*      Do Not search for track - target can't
                        be in cache
            ;*      Do a Cache to Cache Copy of the
                        source
            ;*      Load the copy with the target address
            ;*      Schedule the Destage of the track
            ;*  ENDIF
        ENDIF
    ENDIF
ENDFOR
```

Once this operation is completed, the source and target virtual track directory entries are updated at step 1704 to indicate their status as source and target, respectively and the virtual track address information contained therein is modified at step 1705 to indicate that both of these virtual track directory entries are part of a copy loop.

In order to limit the length of the singly linked list of source and target tracks in the copy operation, the length of the copy list is checked at step 1706 and if less than a predetermined limit, the task is completed. If the copy list exceeds this predetermined limit, then at step 1707 a second copy loop is created as described in the following copy count management code:

```
IF the loop is bigger than limit
    Set 'Hold Off VCKD Response' flag
    Increment Copy Notify County in Copy Command in
        Virtual Device Table
    IF any target is marked as Modified or as a
        pseudosource
            Mark Pseudosource as 'Notify when Destaged'
            ;*  Destage Task will tell Copy Task when the
            ;*  destage is complete and the Loop Size is
                reduced
            CALL Destage Track Cache function
                PASS Virtual Track Address
                PASS No Response Indicator
    ELSE (No tracks are modified)
            Mark Target as Pseudosource in VTD Entry
            (Set Source and Target)
            Mark Target (Pseudosource) as 'Notify when
            Destaged'
            CALL Stage and Destage Track cache service
            routine
                PASS Target Address
            ;*  Cache SW must hash to the passed address.
            ;*  IF the track is in cache
            ;*      Schedule the Destage of the track
            ;*  ELSE (Track is not in cache)
            ;*      Schedule the Stage of the track
            ;*      Once track is in cache, immediately
            ;*          schedule the Destage of the track
            ;*  ENDIF
            ;*  When track is destaged, Destage Task
                breaks Copy Loop
            ;*  into two Copy Loops with pseudosource as
                new source,
            ;*  and returns response to Copy Task.
    ENDIF
ENDIF
```

The storage control also includes a free space directory 800 (FIG. 8) which is a list of all of the logical cylinders in disk drive array data storage subsystem 100 ordered by logical device. Each logical device is cataloged in a list called a free space list 801 for the logical device; each list entry represents a logical cylinder and indicates the amount of free space that this logical cylinder presently contains. This free space directory 800 contains a positional entry for each logical cylinder and each entry includes both forward 802 and backward 803 pointers for the doubly linked free space list for its logical device and the number of free sectors contained in the logical cylinder. Each of these pointers 802, 803 points either to another entry in the free space list for its logical device or is null. The collection of free space is a background process that is implemented in disk drive array data storage subsystem 100. The free space collection process makes use of the logical cylinder directory which is a list contained in the first sector of each logical cylinder indicative of the contents of that logical cylinder. The logical cylinder directory contains an entry for each virtual track instance contained within the logical cylinder. The entry for each virtual track instance contains the identifier of the virtual track instance and the identifier of the relative sector within the logical cylinder in which the virtual track instance begins. From this directory and the virtual track directory, the free space collection process can determine which virtual track instances are still current in this logical cylinder and therefore need to be moved to another location to make the logical cylinder available for writing new data.

Mapping Table Fail Soft Techniques

It is evident from the above description that the loss of the mapping tables would be catastrophic since the location of the data stored in disk drive array 100 is unknown without accurate mapping tables and therefore the data is effectively lost. Since such an occasion is so catastrophic, the mapping tables are backed up in such a manner as to minimize the impact of a loss of a mapping table. Since the mapping tables are large and are changed on a continuous basis, a totally accurate non-volatile backup copy of the mapping tables is difficult to maintain. The mapping tables are backed up by a pair of alternating fuzzy image copies and a pair of associated change journals. The primary or current copy of the mapping tables is stored in the cache memory 113 while the backup fuzzy image copies are stored on redundancy groups of disk drives 122; the change journals are kept in the non-volatile portion of cache memory 113. An image copy of a table or a file has traditionally meant a complete sequentially organized copy of all of the file. Therefore a change to the file must be delayed while an image copy is made. In order to eliminate the need for this delay, a fuzzy image copy can be used instead. A fuzzy image copy is an image copy taken while changes are potentially being made to the table or file being copied. In order for the fuzzy image copy to be of any value, a journal of the changes that were made to the file during the time that the image copy was being produced is also stored in a non-volatile memory. Thus, once the fuzzy image copy is produced, the journal of changes can be used to update the fuzzy image copy to be a complete image copy. This produces the correct image of the file as it was at the end of the most recent modifications. The use of two alternating memory areas is necessitated by the fact that when a fuzzy image copy if being updated by the journal of changes, the second memory area stores memory updates occurring during the journal change update process. Therefore, for the mapping table recovery, the change journals are read out of cache memory 113 and used to update the fuzzy image copy of the mapping tables stored on redundancy groups of disk drives 122. As a further memory protection arrangement, each virtual track instance stored on the disks in disk drive array data storage subsystem 100 is self defining. Each virtual track instance contains the virtual device identifier and the virtual cylinder and head numbers which are all written within the virtual track instance.

Open Logical Cylinder List

Figure 5:
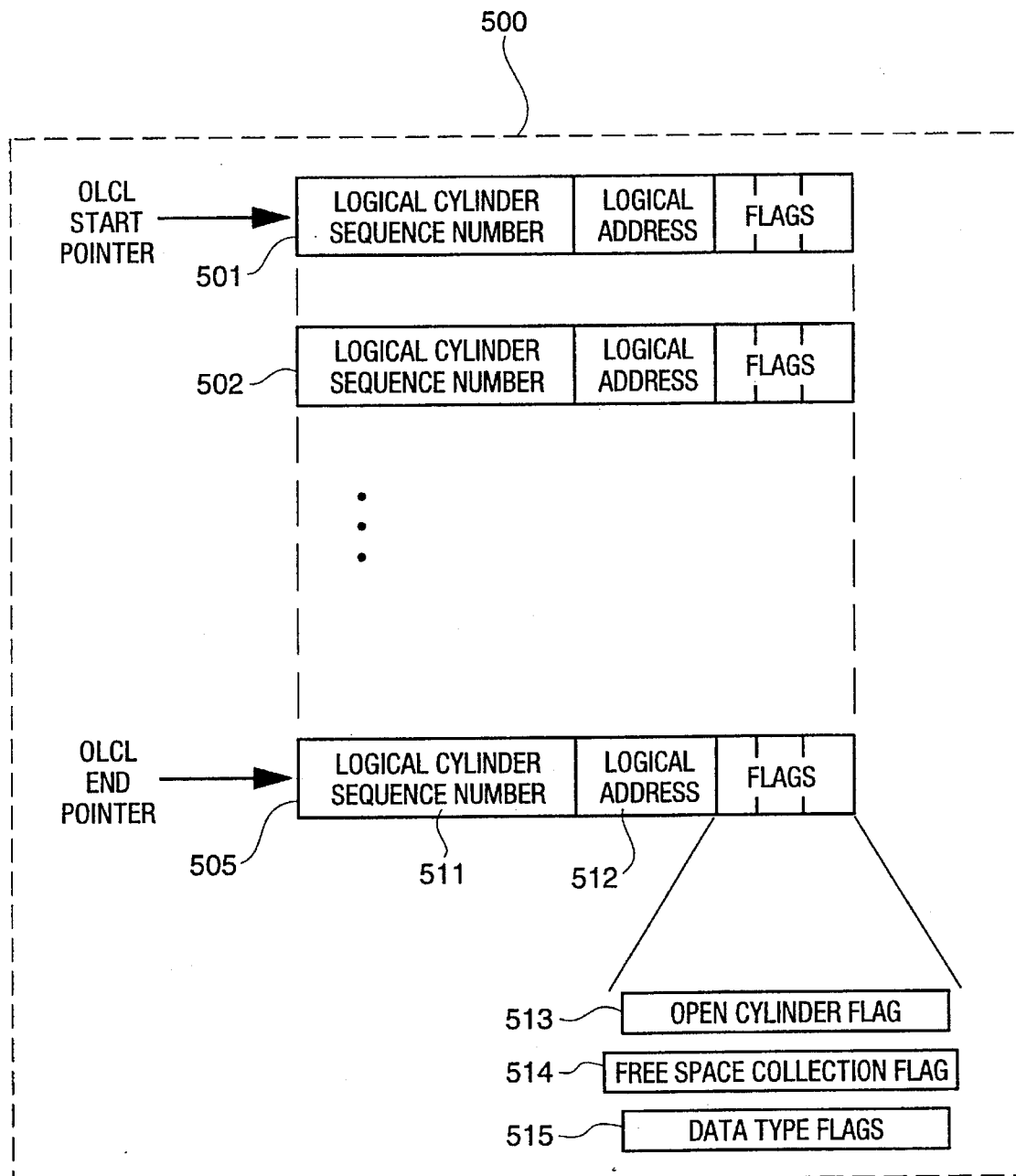
FIG. 5 illustrates a typical free space directory entry.

The Open Logical Cylinder List 500 (OLCL) is illustrated in FIG. 5. The Open Logical Cylinder List 500 is a circular list that documents all the open Logical Cylinders on the DASD that are included in the sequence of Logical Cylinders starting with the presently open destage cylinder 501 with the smallest Logical Cylinder Sequence Number (LCSN) and ending with the logical cylinder 505, open or closed, with the largest LCSN. If a logical cylinder 502 is closed before a lower numbered logical cylinder 501, the logical cylinder 502 remains in the list even though it is closed. The Open Logical Cylinder List Lock 900 controls access to the Open Logical Cylinder List 500. The Open Logical Cylinder List Start 501 and End 505 Pointers bound the valid entries in this circular list. Each entry in the Open Logical Cylinder List 500 contains the cylinder's Logical Cylinder Sequence Number 511 and the Logical Cylinder Address 512 which are used to uniquely define the cylinder. The entry also contains state flags, such as the Cylinder Open Flag 513 and the Free Space Collection Cylinder Flag 514, used to indicate the state of the Logical Cylinder. The entry also contains Data Type flags 515 which are used to identify the type of data contained in the Logical Cylinder.

Figure 16:
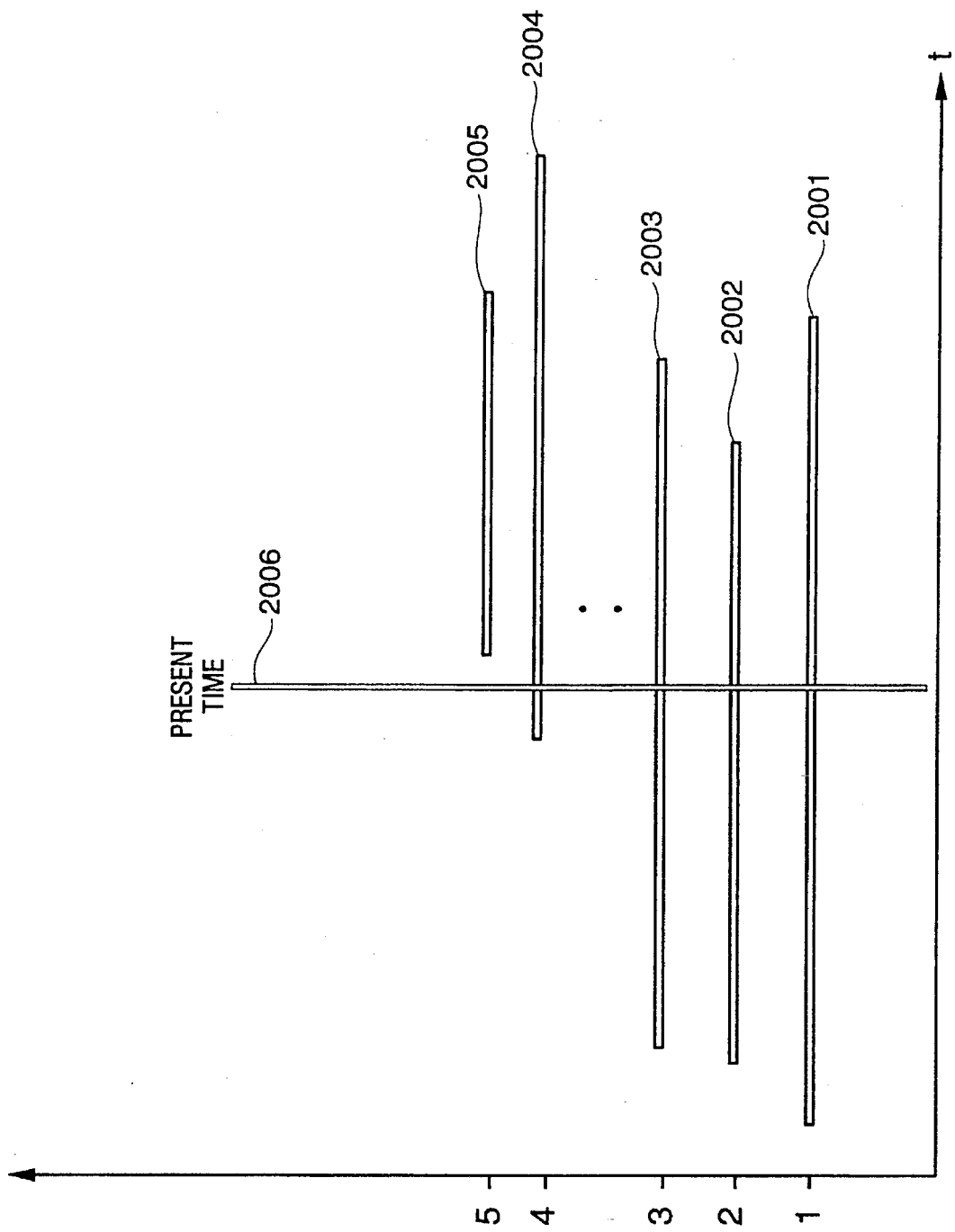
FIG. 16 illustrates a time diagram of multiple open logical cylinders.

The interrelationship of the multiple open logical cylinders is illustrated in FIG. 16. Data storage subsystem 100 maintains a plurality of write cursors 2000–2004 concurrently active. Each of write cursors 2000–2004 point to an open logical cylinder in the plurality of redundancy groups contained in data storage subsystem 100. These redundancy groups need not be uniform in size, capacity or media type. One redundancy group can be high capacity, relatively low performance while another redundancy group can be lower capacity but higher performance, for example. In addition, multiple copies of a virtual track can be stored in the various redundancy groups, with each copy representing earlier or later instances of the same virtual track. In this system, it is essential to properly order the writing of virtual tracks to the open logical cylinders to ensure the integrity of the data contained therein.

In this system, when the data is written to destage cylinders, logical cylinder sequence numbers that is, the serial numbers that go with the logical cylinders indicate the order that the data was written. The logical cylinders are serialized and the sequencing of the tracks within a logical cylinder are algorithmically determined. Therefore, a virtual track instance can unambiguously be differentiated from other instances of the same virtual track. In order to simplify the data management task, the time sequence of the opening of logical cylinders controls the writing of data to the open logical cylinders. In FIG. 16, the horizontal axis of the chart is time, while the various lines indicate the write cursors for various open logical cylinders. Vertical line 2005 represents the open logical cylinder list at a particular point in time, such as the present time as noted in FIG. 16. Thus, write cursor 2000 points to the first in time open logical cylinder while write cursors 2001–2004 are timewise successively active write cursors. Since the open logical cylinders are timewise successively opened, a virtual track instance that appears in one of the open logical cylinders 2001 can be written to a timewise later open logical cylinder 2004 not a timewise earlier open logical cylinder 2000.

Logical Cylinder Directory

Figure 3:
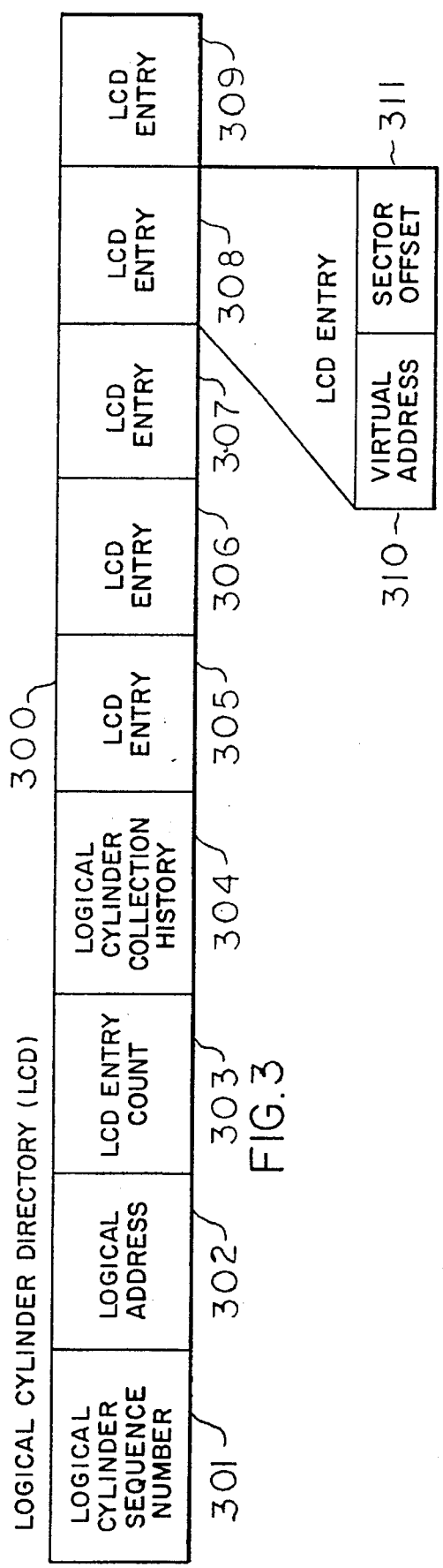
FIG. 3 illustrates a typical logical cylinder directory.

FIG. 3 illustrates the format of the Logical Cylinder Directory 300. Each Logical Cylinder that is written contains in its last few sectors a Logical Cylinder Directory (LCD) 300. The LCD 300 is an index to the data in the Logical Cylinder and is used primarily by Free Space Collection to determine which Virtual Track Instances in the Logical Cylinder are valid and need to be collected. FIG. 3 shows the LCD 300 in graphic form. The Logical Cylinder Sequence Number (LCSN) 301 uniquely identifies the Logical Cylinder and the sequence in which the Logical Cylinders were created. The LCSN is used primarily during Mapping Table Recovery operations. The Logical Address 302 is used as a confirmation of the Cylinder's location for data integrity considerations. The LCD Entry count 303 is the number of Virtual Track Instances contained in the Logical Cylinder and is used when scanning the LCD Entries. The Logical Cylinder Collection History 304 contains data indicative of when the cylinder was created, whether it was created from Updated Virtual Track Instances or was created from data collected from another cylinder, and if it was created from collected data, what was the nature of the collected data. Each LCD Entry 305–309 itself contains the identifier of the virtual track 310 and the identifier of the relative sector 311 within the logical cylinder in which the virtual track instance begins.

Data Read Operation

Figure 6:
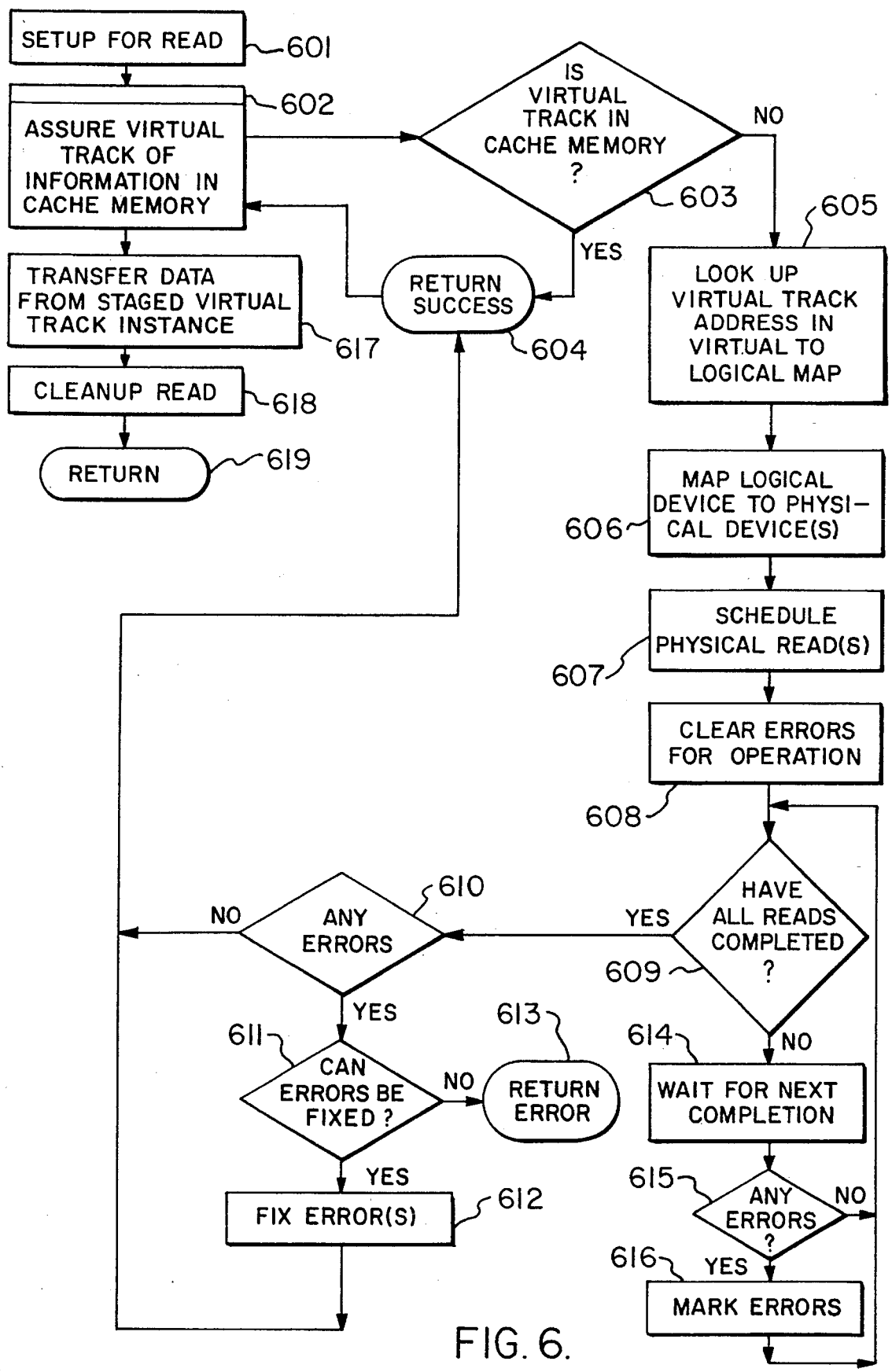
FIGS. 6 and 7 illustrate, in flow diagram form, the operational steps taken to perform a data read and write operation, respectively.

FIG. 6 illustrates in flow diagram form the operational steps taken by processor 204 in control unit 101 of the data storage subsystem 100 to read data from a disk drive redundancy group 122-1 to 122-n+m in the disk drive array cluster 103-1. The disk drive array data storage subsystem 100 supports reads of any size. However, the logical layer only supports reads of virtual track instances. In order to perform a read operation, the virtual track instance that contains the data to be read is staged from the logical layer into cache memory 113. The data record is then transferred from cache memory 113 and any clean up is performed to complete the read operation.

At step 601, control unit 101 prepares to read a record from a virtual track. At step 602, the control unit 101 branches to the cache directory search subroutine to assure that the virtual track is located in cache memory 113 since the may already have been staged into cache memory 113 and stored therein in addition to having a copy stored on the plurality of disk drives (122-1 to 122-n+m) that constitute the redundancy group in which the virtual track is stored. At step 603, control unit 101 scans the hash table directory of cache memory 113 to determine whether the requested virtual track is located in cache memory 113. If it is, at step 604 control returns back to the main read operation routine and the cache staging subroutine that constitutes steps 605–616 is terminated.

Assume, for the purpose of this description, that the virtual track that has been requested is not located in cache memory 113. Processing proceeds to step 605 where control unit 101 looks up the address of the virtual track in the virtual to logical map table. At step 606, the logical map location is used to map the logical device to a physical device in the redundancy group. At step 607, control unit 101 schedules one or more physical read operations to retrieve the virtual track instance from appropriate ones of identified physical devices 122-1 to 122-n+m. At step 608, control unit 101 clears errors for these operations. At step 609, a determination is made whether all the reads have been completed, since the requested virtual track instance may be stored on more than one of the N+M disk drives in a redundancy group. If all of the reads have not been completed, processing proceeds to step 614 where control unit 101 waits for the next completion of a read operation by one of the N+M disk drives in the redundancy group. At step 615 the next reading disk drive has completed its operation and a determination is made whether there are any errors in the read operation that has just been completed. If there are errors, at step 616 the errors are marked and control proceeds back to the beginning of step 609 where a determination is made whether all the reads have been completed. If at this point all the reads have been completed and all portions of the virtual track instance have been retrieved from the redundancy group then processing proceeds to step 610 where a determination is made whether there are any errors in the reads that have been completed. If errors are detected then at step 611 a determination is made whether the errors can be fixed. One error correction method is the use of a Reed-Solomon error detection/correction code to recreate the data that cannot be read directly. If the errors cannot be repaired then a flag is set to indicate to control unit 101 that the virtual track instance can not be read accurately. If the errors can be fixed, then in step 612 the identified errors are corrected and processing returns back to the main routine at step 604 where a successful read of the virtual track instance from the redundancy group to cache memory 113 has been completed.

At step 617, control unit 101 transfers the requested data record from the staged virtual track instance in which it is presently stored. Once the records of interest from the staged virtual track have been transferred to host processor 11 that requested this information, than at step 618 control unit 101 cleans up the read operation by performing the administrative tasks necessary to place all of the apparatus required to stage the virtual track instance from the redundancy group to cache memory 113 into an idle state and control returns at step 619 to service the next operation that is requested.

Data Write Operation

Figure 7:
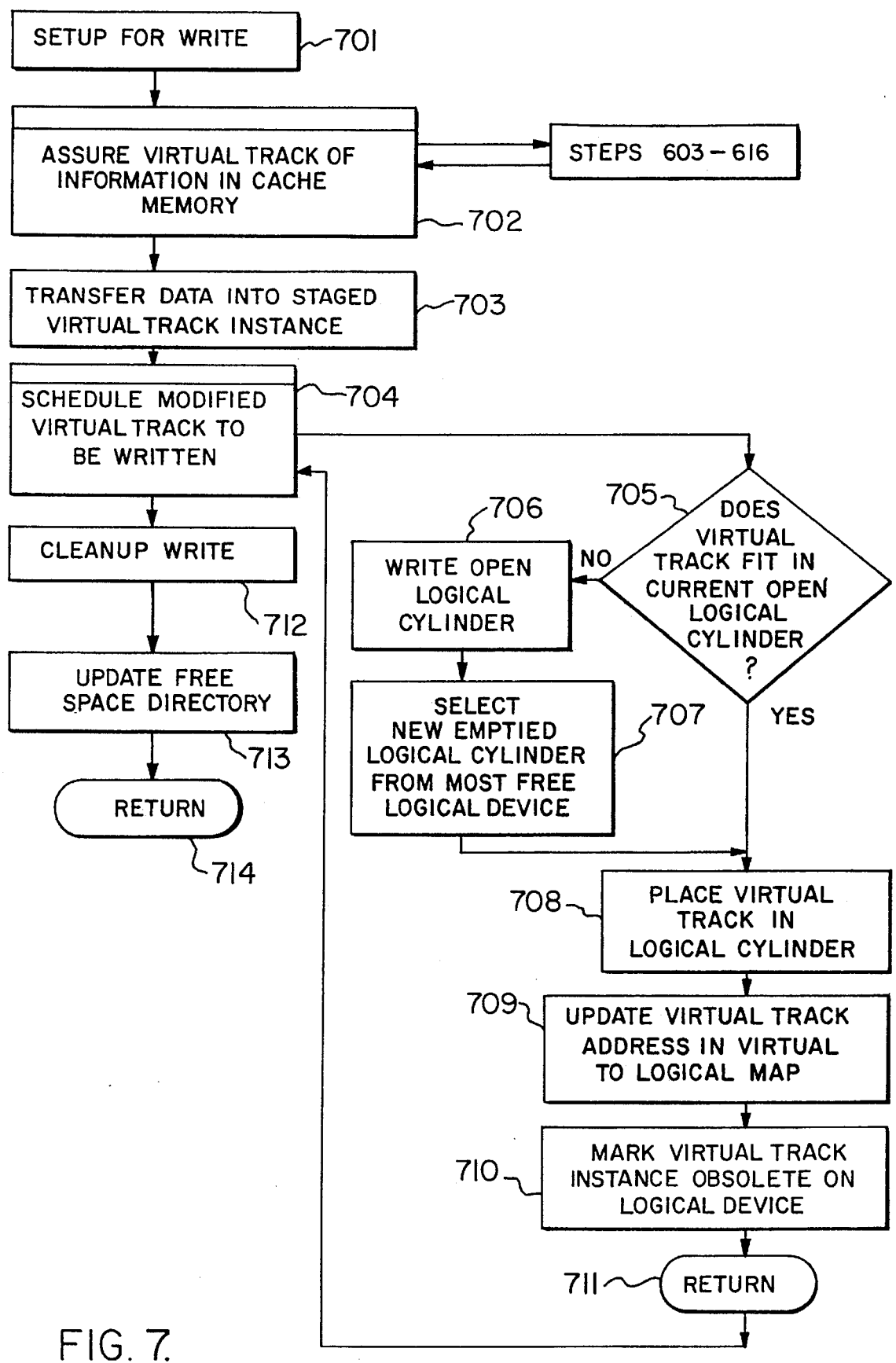

FIG. 7 illustrates in flow diagram form the operational steps taken by the disk drive array data storage subsystem 100 to perform a basic data write operation. The disk drive array data storage subsystem 100 supports writes of any size, but again, the logical layer only supports writes of virtual track instances. Therefore in order to perform a write operation, the virtual track that contains the data record to be rewritten is staged from the logical layer into cache memory 113. Once the write operation is complete, the location of the obsolete instance of the virtual track is marked as free space. The data record is then transferred into the modified virtual track and this updated virtual track instance is then scheduled to be written from cache memory 113, where the data record modification has taken place, into the logical layer. Any clean up of the write operation is then performed once the transfer and write operations are completed.

At step 701, control unit 101 performs the set up for a write operation and at step 702, as with the read operation described above, control unit 101 branches to the cache subroutine to assure that the virtual track into which the data is to be transferred is located in cache memory 113. Since all of the data updating is performed in cache memory 113, the virtual track in which this data is to be written must be transferred from the redundancy group in which it is stored to cache memory 113 if it is not already resident in cache memory 113. The transfer of the requested virtual track instance to the cache memory 113 is performed for a write operation as it is described above with respect to a data read operation and constitutes steps 603–616 illustrated in FIG. 6 above.

At step 703, control unit 101 marks the virtual track instance that is stored in the redundancy group as invalid in order to assure that the logical location at which this virtual track instance is stored is not accessed in response to another host processor 12 attempting to read or write the same virtual track. Since the modified record data is to be written into this virtual track in cache memory 113, the copy of the virtual track that resides in the redundancy group is now inaccurate and must be removed from access by the host processors 11–12. At step 704, control unit 101 transfers the modified record data received from host processor 11 into the virtual track that has been retrieved from the redundancy group into cache memory 113 to thereby merge this modified record data into the original virtual track instance that was retrieved from the redundancy group. Once this merge has been completed and the virtual track now is updated with the modified record data received from host processor 11, control unit 101 must schedule this updated virtual track instance to be written onto a redundancy group somewhere in the disk drive array data storage subsystem 100.

This scheduling for a single open logical cylinder is accomplished by the subroutine that consists of steps 706–711. At step 706, control unit 101 determines whether the virtual track instance as updated fits into an available open logical cylinder. If it does not fit into an available open logical cylinder, then at step 707 then this presently open logical cylinder must be closed out and written to the physical layer and another logical cylinder selected from the most free logical device or redundancy group in the disk drive array data storage subsystem 100. At step 708, the selection of a free logical cylinder from the most free logical device takes place. This ensures that the data files received from host processor 11 are distributed across the plurality of redundancy groups in the disk drive array data storage subsystem 100 in an even manner to avoid overloading certain redundancy groups while underloading other redundancy groups. Once a free logical cylinder is available, either being the presently open logical cylinder or a newly selected logical cylinder, then at step 709, control unit 101 writes the updated virtual track instance into the logical cylinder and at step 710 the new location of the virtual track is placed in the virtual to logical map in order to render it available to the host processors 11–12. At step 711, control returns to the main routine, where at step 712 control unit 101 cleans up the remaining administrative tasks to complete the write operation and return to an available state at 712 for further read or write operations from host processor 11.

Data Destaging Process for Multiple Open Logical Cylinders

Figure 14:
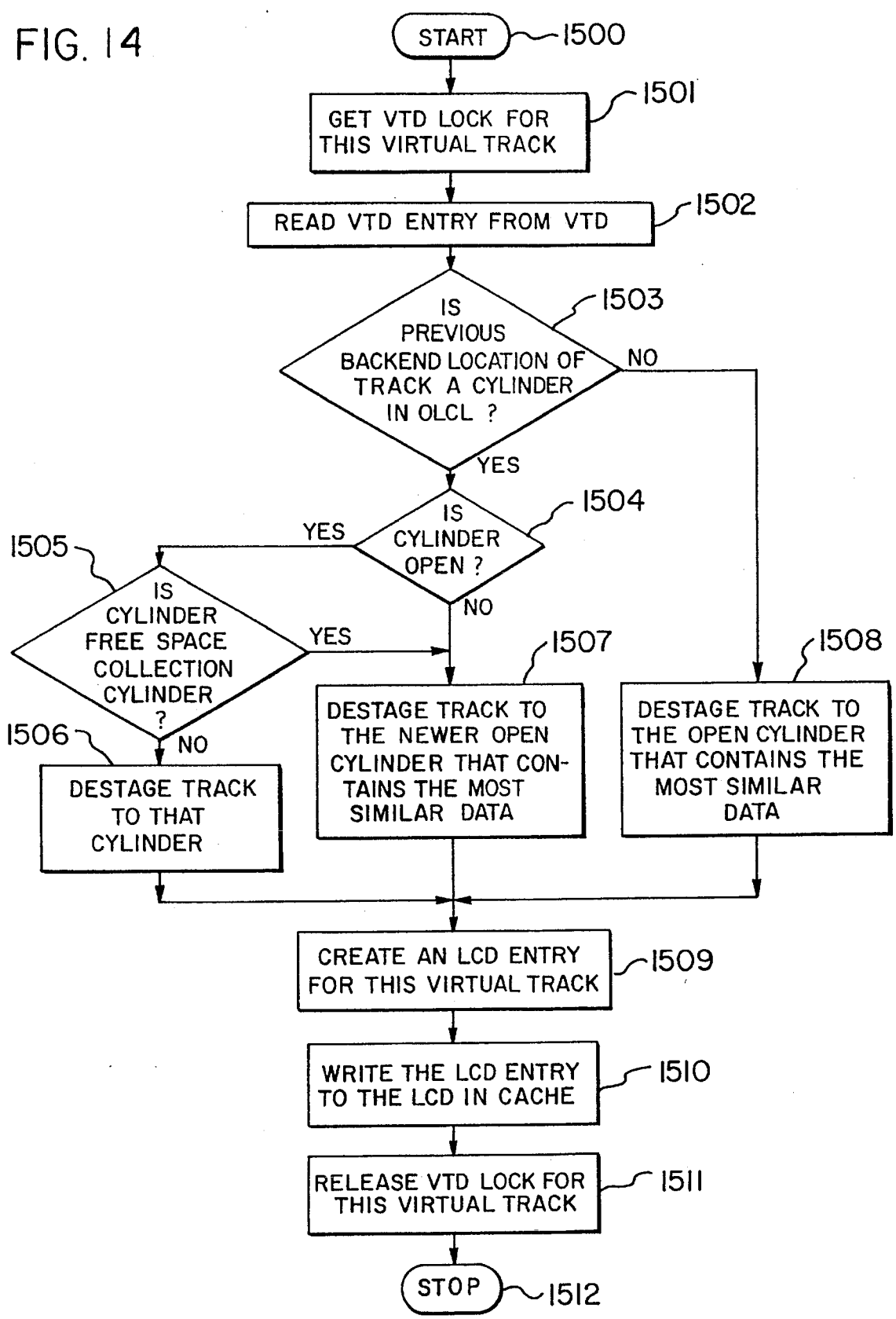
FIGS. 14 and 15 illustrates, in flow diagram form, the set-up and clean-up processes for destaging data for multiple open logical cylinders.

FIG. 14 illustrates in flow diagram form the process steps necessary to ensure data integrity with multiple open destage cylinders. When the destaging of data is scheduled, the previous backend location of the data is checked to see if there is any special handling that needs to be done. The destaging process is illustrated in flow diagram form in FIG. 14. This process is entered at step 1500 and the track lock for this virtual track in the virtual track directory is set at step 1501. At step 1502, the table entry for this virtual track is read from the virtual track directory. Once the table entry is retrieved, its contents are compared with the open logical cylinder list to determine whether the previous backend location of this virtual track is a cylinder that is listed in the open logical cylinder list. If there is not a match in this comparison at step 1503, processing advances to step 1508 where the virtual track can be destaged to any open cylinder as listed in the open logical cylinder list. The data is written to the open destage cylinder containing data most like the virtual track being destaged as indicated in the open logical cylinder entry flags. If there is a match at the comparison performed at step 1503, the next consideration is whether this logical cylinder is presently open. At step 1504, if it is determined that the logical cylinder is not open, processing advances to step 1507 where the virtual track is destaged to the next newer open logical cylinder as noted in the open logical cylinder list. If the cylinder is open as determined at step 1504, processing advances to step 1505 where it is determined whether this logical cylinder is a free space collection cylinder. If the present logical cylinder is so classified at step 1505, processing advances to step 1507 where the virtual track is destaged to a newer open logical cylinder as noted in the open logical cylinder list that contains the most similar data. If the present logical cylinder is not a free space collection cylinder as determined at step 1505, processing advances to step 1506 where the virtual track is destaged to that cylinder or a newer open cylinder that contains the most similar data. Thus, the status of the cylinder is carefully scrutinized in steps 1503–1505 to identify the status of this selected logical cylinder since a plurality of logical cylinders can be concurrently active for a plurality of different processes. These analysis steps prevent the corruption of the data due to these independent processes acting on the data in the virtual track in a manner that supports the process that is attempting to destage the logical track. If there are multiple cylinders which can receive the data, the data is destaged to the most appropriate logical cylinder based on the type of data and the data already contained on the open logical cylinders. Once the corresponding one of steps 1506–1508 are executed to destage the virtual track to the selected open logical cylinder, at step 1509 a table entry is created for this virtual track in the processor's local memory. This entry is then written to the logical cylinder directory in cache memory 113 at step 1510 and the track lock in the virtual table directory for this virtual track is released at step 1511 and processing exits at step 1512.

Data Move/Copy Operation

The data file move/copy operation instantaneously relocates or creates a second instance of a selected data file by merely generating a new set of pointers to reference the same physical memory location as the original set of reference pointers in the virtual track directory. In this fashion, by simply generating a new set of pointers referencing the same physical memory space, the data file can be moved/copied. The copied data file is not marked as modified, instead the copied data file retains the modified or unmodified state that was assigned to the original data file.

This apparatus instantaneously moves the original data file without the time penalty of having to download the data file to the cache memory 113 and write the data file to a new physical memory location. For the purpose of enabling a program to simply access the data file at a different virtual address the use of this mechanism provides a significant time advantage and a physical space savings. A physical copy of the original data record can later be written as a background process to a second memory location, if so desired. Alternatively, when one of the programs that can access the data file writes data to or modifies the data file in any way, the modified copy of a portion of the original data file is written to a new physical memory location and the corresponding address pointers are changed to reflect the new location of this rewritten portion of the data file. In this fashion, a data file can be instantaneously moved/copies by simply creating a new set of memory pointers and the actual physical copying of the data file can take place either as a background process or incrementally as necessary when each virtual track of the data file is modified by one of the programs that accesses the data file.

Virtual Track Directory Source and Target Flags

Each entry in the Virtual Track Directory (VTD) contains two flags associated with the Copy/Move function. The "Source" flag is set whenever a Virtual Track Instance at this Virtual Track Address has been the origin of a copy or move. The Virtual Track Instance pointed to by this entry is not necessarily the Source, but the Virtual Track Instance contains this Virtual Address. The "Target" flag is set whenever a Virtual Track Instance contains data that has been the destination of a copy or move. If the Target flag is set, the Virtual Address in the Virtual Track Instance that is pointed to is not that of the VTD Entry.

Instant Copying

Figure 12:
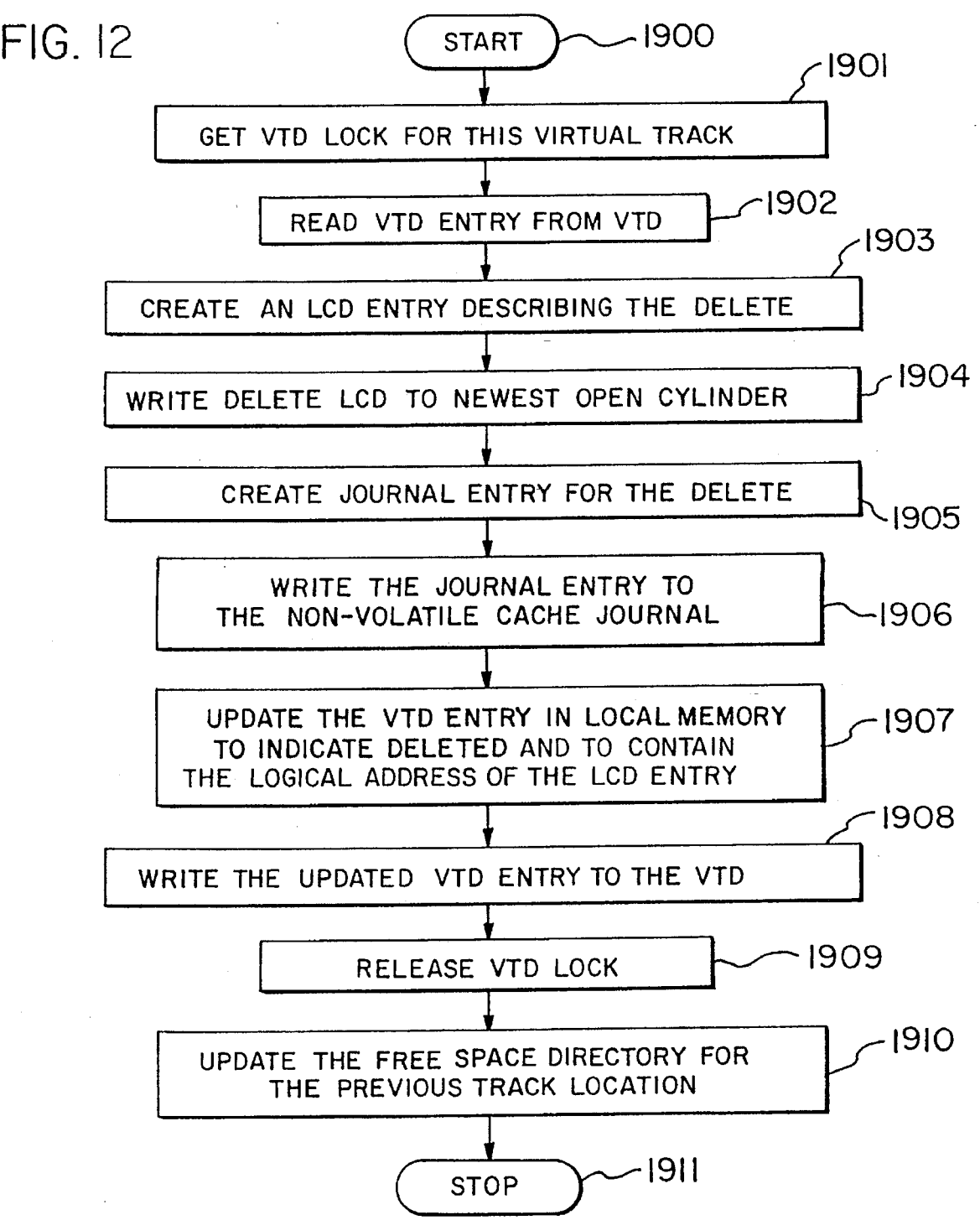
FIG. 12 illustrates, in flow diagram form, the delete track process.
Figure 13:
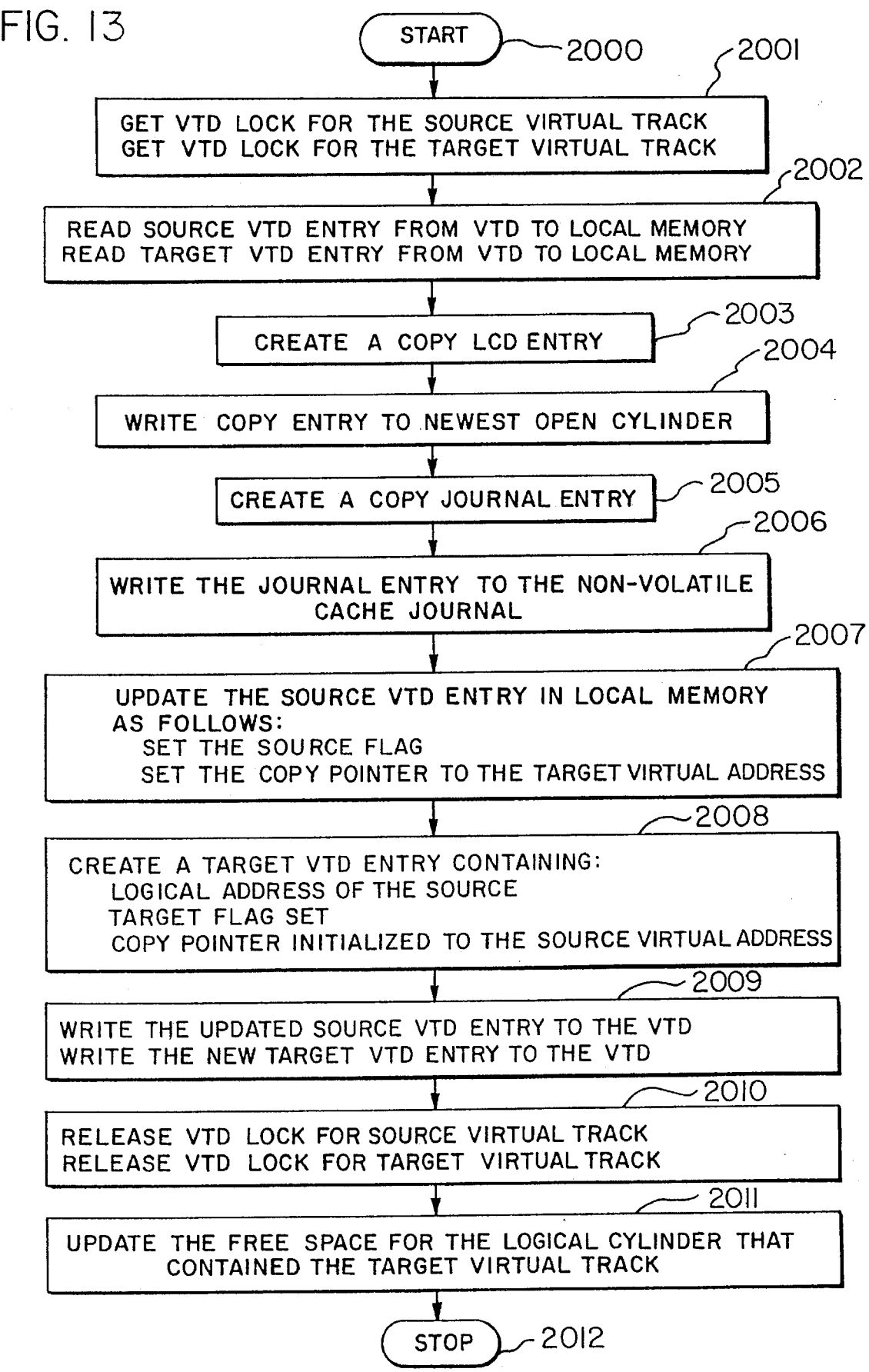
FIG. 13 illustrates, in flow diagram form, the copy track process.

A similar data integrity process must take place for the instant copy process wherein a virtual track is instantaneously copied and requires the use of track locks to prevent contention between independent concurrently operating processes in data storage subsystem 100. The instant copy process illustrated in FIG. 13 is similar to the data set delete process illustrated in FIG. 12. The significant difference between the two is that for each step in the data set delete process of FIG. 12 two steps are performed in the instant copy process of FIG. 13. This is due to the fact that instead of a single data set being deleted as in FIG. 12, two virtual tracks are being managed in the flow chart of FIG. 13, a source virtual track and a target virtual track. The most significant difference between the flow chart of FIG. 13 and that of FIG. 12 is that at step 1707, the table entry for the virtual track directory is updated wherein the source virtual track includes a notation that this is a source virtual track and the associated copy pointers contains data indicative of the target virtual track virtual address. Similarly, at step 1708, the table entry for the target virtual track contains the logical address of the source virtual track as well as a set target flag indicative that this virtual track is created as the result of an instant copy. The copy pointer associated with this table entry is initialized to indicate the source virtual track virtual address. In this manner, the status of both the source and the target virtual tracks are properly managed to avoid corruption of the data contained in these locations.

Free Space Collection

Figure 8:
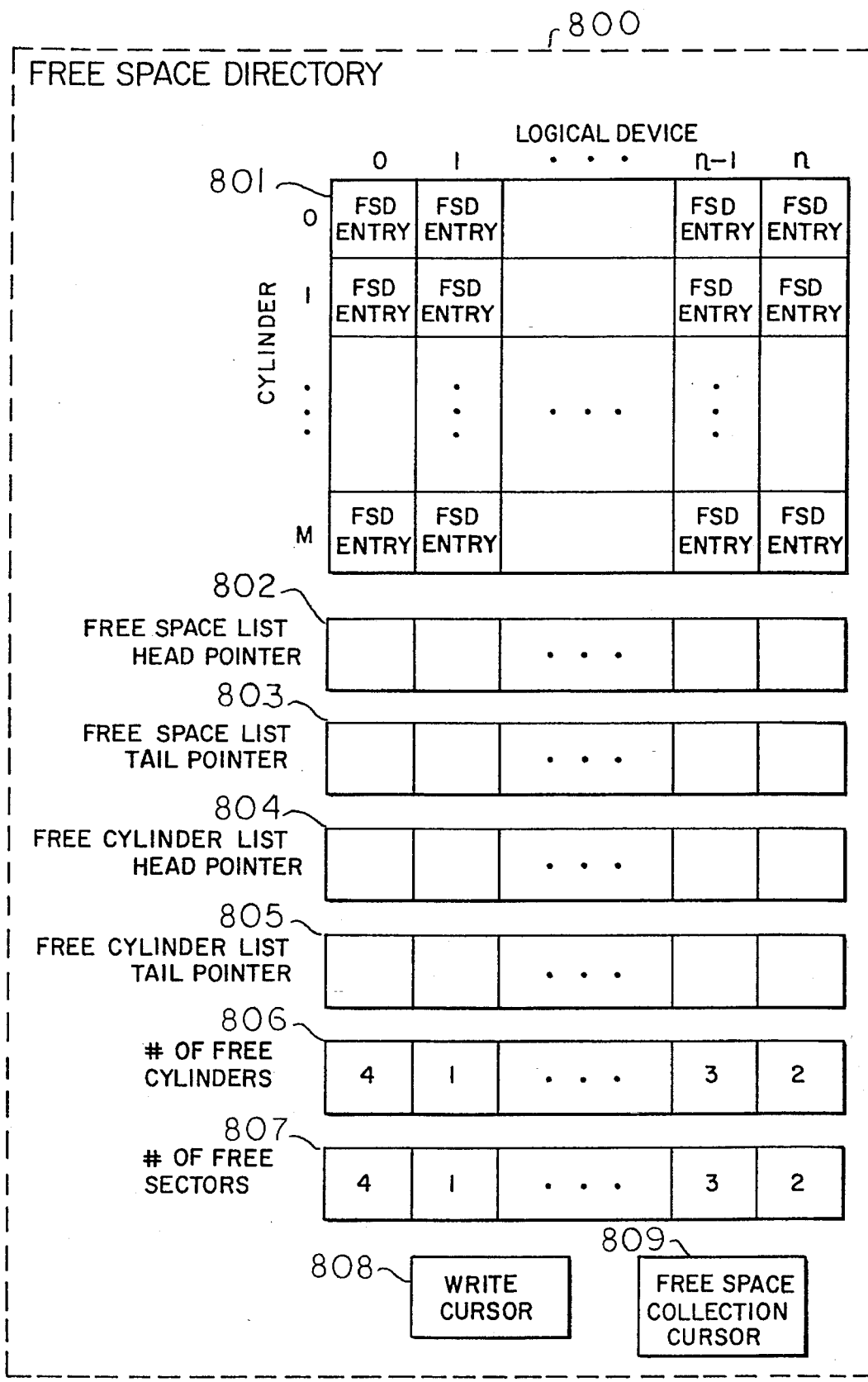
FIG. 8 illustrates a typical free space directory used in the data storage subsystem.

When data in cache memory 113 is modified, it cannot be written back to its previous location on a disk drive in disk drive subsets 103 since that would invalidate the redundancy information on that logical track for the redundancy group. Therefore, once a virtual track has been updated, that track must be written to a new location in the data storage subsystem 100 and the data in the previous location must be marked as free space. Therefore, in each redundancy group, the logical cylinders become riddled with "holes" of obsolete data in the form of virtual track instances that are marked as obsolete. In order to create completely empty logical cylinders for destaging, the valid data in partially valid cylinders must be read into cache memory 113 and rewritten into new previously emptied logical cylinders. This process is called free space collection. The free space collection function is accomplished by control unit 101. Control unit 101 selects a logical cylinder that needs to be collected as a function of how much free space it contains. The free space determination is based on the free space directory as illustrated in FIG. 8, which indicates the availability of unused memory in data storage subsystem 100. The table illustrated in FIG. 8 is a listing of all of the logical devices contained in data storage subsystem 100 and the identification of each of the logical cylinders contained therein. The entries in this chart represent the number of free physical sectors in this particular logical cylinder. A write cursor 808 is maintained in memory and this write cursor 808 indicates the available open logical cylinder 2000 that control unit 101 will write to when data is destaged from cache 113 after modification by associated host processor 11–12 or as part of a free space collection process. In addition, a free space collection cursor 809 is maintained which points to the present logical cylinder that is being cleared as part of a free space collection process. Therefore, control unit 101 can review the free space directory illustrated in FIG. 8 as a backend process to determine which logical cylinder on a logical device would most benefit from free space collection. Control unit 101 activates the free space collection process by reading all of the valid data from the selected logical cylinder into cache memory 113. The logical cylinder is then listed as completely empty and linked into the Free Cylinder List since all of the virtual track instances therein are tagged as obsolete. Additional logical cylinders are collected for free space collection purposes or as data is received from an associated host processor 11–12 until a complete logical cylinder has been filled. Once a complete logical cylinder has been filled, a new previously emptied logical cylinder is chosen.

Figure 4:
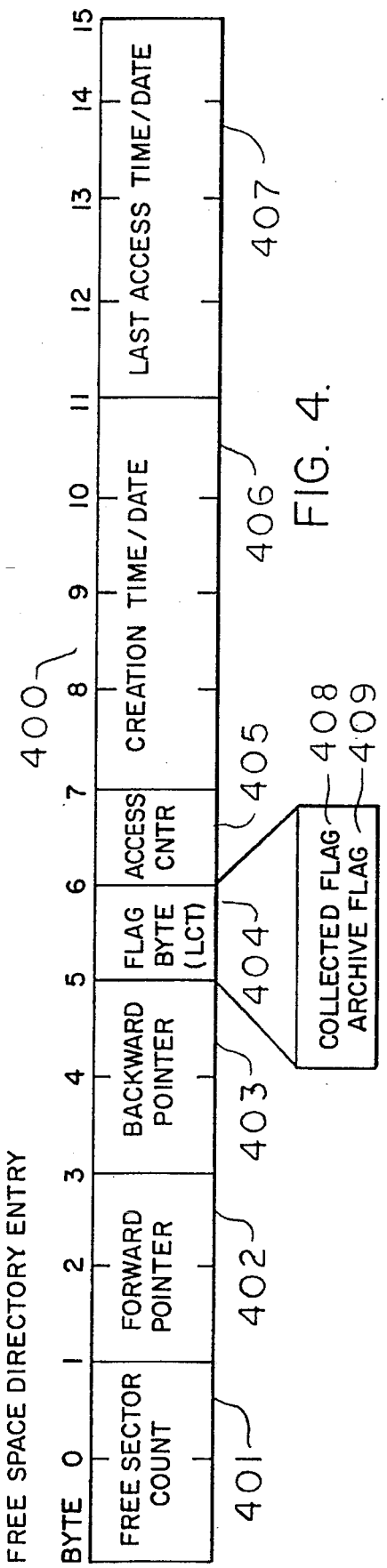
FIG. 4 illustrates a typical open logical cylinder list.
Figure 10:
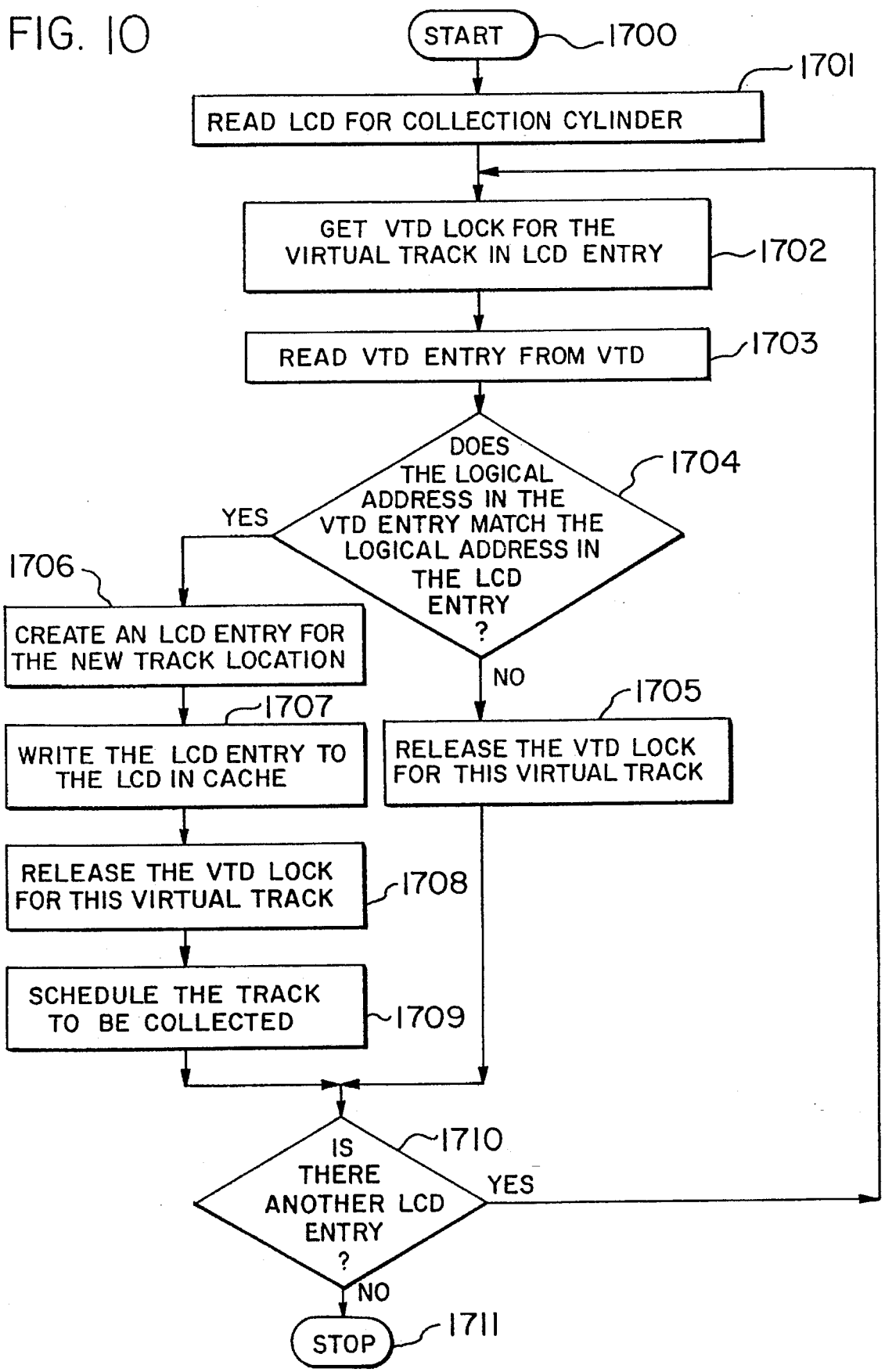
FIGS. 10 and 11 illustrate, in flow diagram form, the free space collection processes.

FIG. 10 illustrates in flow diagram form the operational steps taken by processor 204 to implement the free space collection process. When Free Space collection has to be done, the best logical cylinder to collect is the one with the most sectors already free. This leads to the notion of a list of all of the logical cylinders in data storage subsystem 100 ordered by the amount of Free Space each contains. Actually, a list is maintained for each logical device, since it is desirable to balance free space across logical devices to spread virtual actuator contention as evenly as possible over the logical actuators. The collection of lists is called the Free Space Directory; the list for each logical device is called the Free Space List for the logical device. Each free space entry 400 represents a logical cylinder. Each free space directory entry 400 (FIG. 4) contains a forward 402 and backward 403 pointer to create a double linked list as well. Each logical device's Free Space List is terminated by both head and tail pointers.

Each logical cylinder contains in its last few sectors a directory of its contents, called its Logical Cylinder Directory 300 (LCD). This directory contains an entry for each virtual track instance contained within the logical cylinder. The entry 308 for a virtual track instance contains the identifier of the virtual track 310 and the identifier of the relative sector 311 within the logical cylinder in which the virtual track instance begins. From this directory 300, the serial number of the logical cylinder instance, and the Virtual Track Directory, the Free Space Collection Process can determine which virtual track instances are still current in the logical cylinder and therefore need to be moved to make the logical cylinder available for writing new data.

The free space collection destage cylinders 2000 must have logical cylinder sequence numbers (LCSNs) lower than all the open destage cylinders 2001–2004. This is ensured by reserving LCSNs in advance for collection destage cylinders. If a proper LCSN is not available when free space collection continues to a new destage cylinder, the free space collection process suspends momentarily while regular destage cylinders 2001–2004 are closed out.

The basic processes initiated at step 1700 and at step 1701 processor 204 reads the logical cylinder directory 300 contained in the collection cylinder 200, that is the cylinder to be collected. Next the first LCD entry is read to determine the virtual address of the first track instance in the collection cylinder and, at step 1702, the track lock 900 in the virtual track directory 903 is set. At step 1703, the table entry for this virtual track is read from the virtual track directory 903. Once the table entry is retrieved, its logical address in the virtual track directory 903 is compared to the logical address contained in the logical cylinder directory 300. If these two addresses do not match at step 1704, processing advances to step 1705 where the virtual track directory lock 900 is released for this virtual track. If the two addresses do match at step 1704, at step 1706 a logical cylinder directory entry is created for the new track location. At step 1707 the logical cylinder directory entry is written to the logical cylinder directory in cache memory 113. The virtual track directory lock 900 for this virtual track is then released at step 1708 and the track is scheduled to be collected at step 1709. At step 1710, it is determined whether there is another logical cylinder directory entry to be processed. If there is processing returns to step 1702 and step 1702–1709 are repeated until all the logical cylinder directory entries have been processed. Processing then exits at step 1711.

Figure 11:
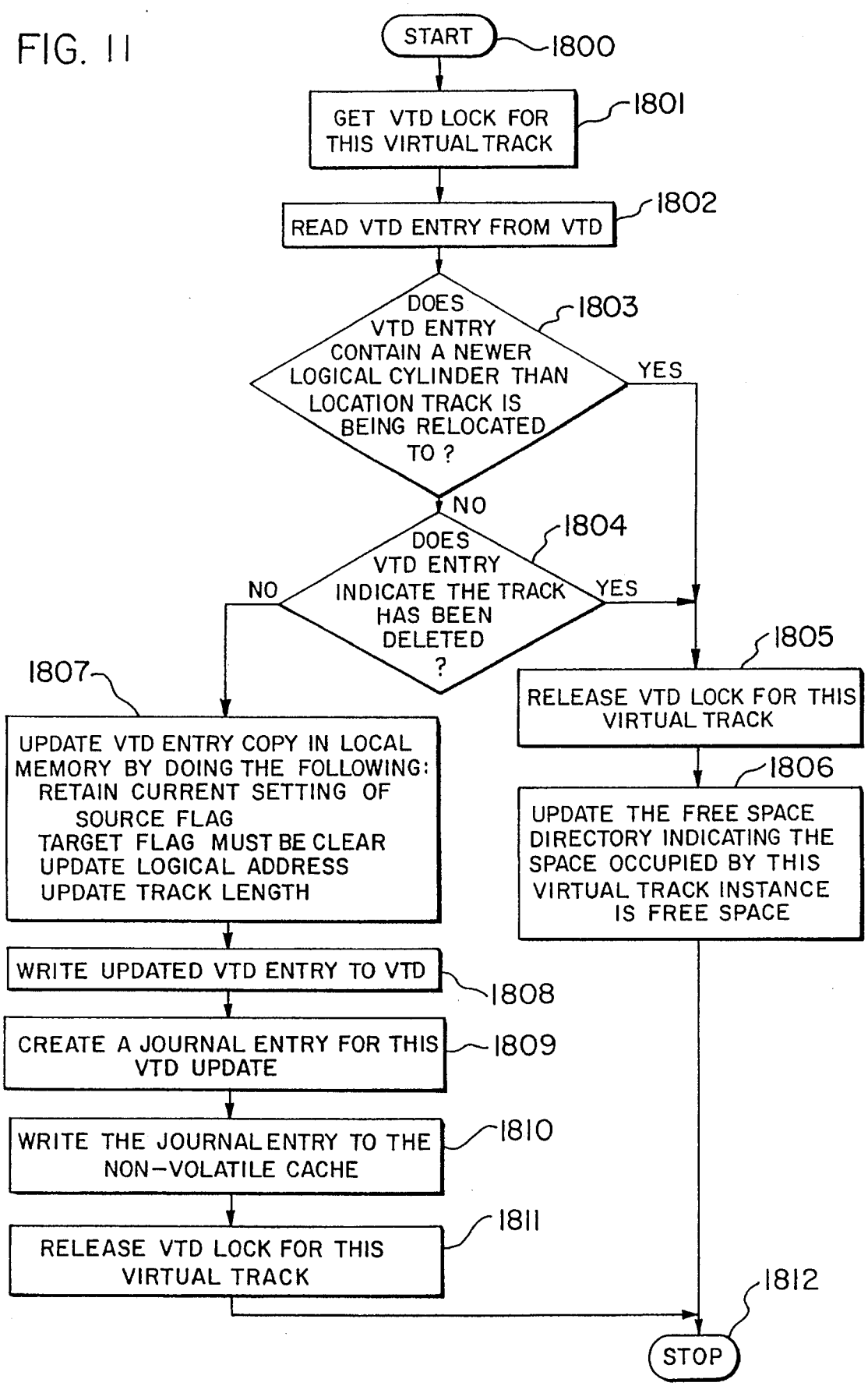

FIG. 11 illustrates the clean up process for the free space collection operation. This process is initiated at step 1800 and processor 204 sets the track lock for this virtual track in the virtual track directory at step 1801. At step 1802, the table entry for this virtual track is read from the virtual track directory 903. Once the table entry is retrieved, its contents are compared with the location that this track is to be relocated to. If the virtual track directory entry contains a newer logical cylinder than the location track that it is being relocated to processing advances to step 1805 where the virtual track directory lock is released for this virtual track and the free space directory is updated at step 1806 to indicate that the space occupied by this virtual track instance is free space. Processing then exits at step 1812. If the comparison at step 1803 returns a negative result, processing advances to step 1804 where the virtual track directory entry is analyzed to determine whether the track has been deleted. If the track has been deleted processing proceeds to steps 1805 and 1806 as described above. If the track was not deleted at step 1807 the virtual track directory entry copy in the local memory is updated by retaining the current setting of the source flag, clearing the target flag and updating both the logical address and the track length. Once these updates have been accomplished, at step 1808 the updated virtual track directory entry is written to the virtual track directory. A journal entry is also created at step 1809 for this virtual track directory update in order to insure integrity of the data. The journal entry is written to the non-volatile cache memory at step 1810 and the virtual track directory lock for this virtual track is released at step 1811. Processing then exits at step 1812.

Enhanced Free Space Collection

Enhanced Free Space Collection occurs when a cylinder is collected that has already been collected before, as indicated by the Collected Flag in the Logical Cylinder Table (LCT). When data is collected and written to a cylinder separate from the normal destaging cylinder, that data is Read-Only or Low Access relative to the rest of the data in the Logical Cylinder, since any data that is updated is written to new cylinders. Data that is collected a second time is Read-Only or Low Access relative to all the data in the subsystem so it is Archive data. When Free Space Collection collects a cylinder that has not been collected before, the basic Free Space Collection Algorithm, as described in the previous section, is used. When Free Space Collection collects a cylinder that has the Collected or the Archive Flag in the LCT set, the Enhanced Free Space Collection Algorithm is used. FIG. 11 illustrates in flow diagram form the operational steps taken by processor 204 in control unit 101 of the data storage subsystem 100 to perform Enhanced Free Space Collection. The differences between Basic and Enhanced Free Space Collection are minor, but they are important to the hierarchical algorithm since they differentiate data into Low Access and Regular Access Logical Cylinders. In step 1100, we allocate two logical cylinders to receive the data collected during free space collection. One cylinder is used for Low Access Data and the other is used for Regular Access Data. Steps 1001 through 1006 are the same as the basic algorithm. At step 1107 there is a test to determine if the virtual track that has been read from the cylinder being collected is Low Access. The age of the Logical Cylinder is calculated by subtracting the Creation Data/Time (in the LCD) from the Current Data/Time. If the virtual track is low access, the data is written, at step 1108 to the low access logical cylinder. If the virtual track is not low access, the data is written, at step 1109 to the regular access logical cylinder.

Destaging Process Clean UP

Figure 15:
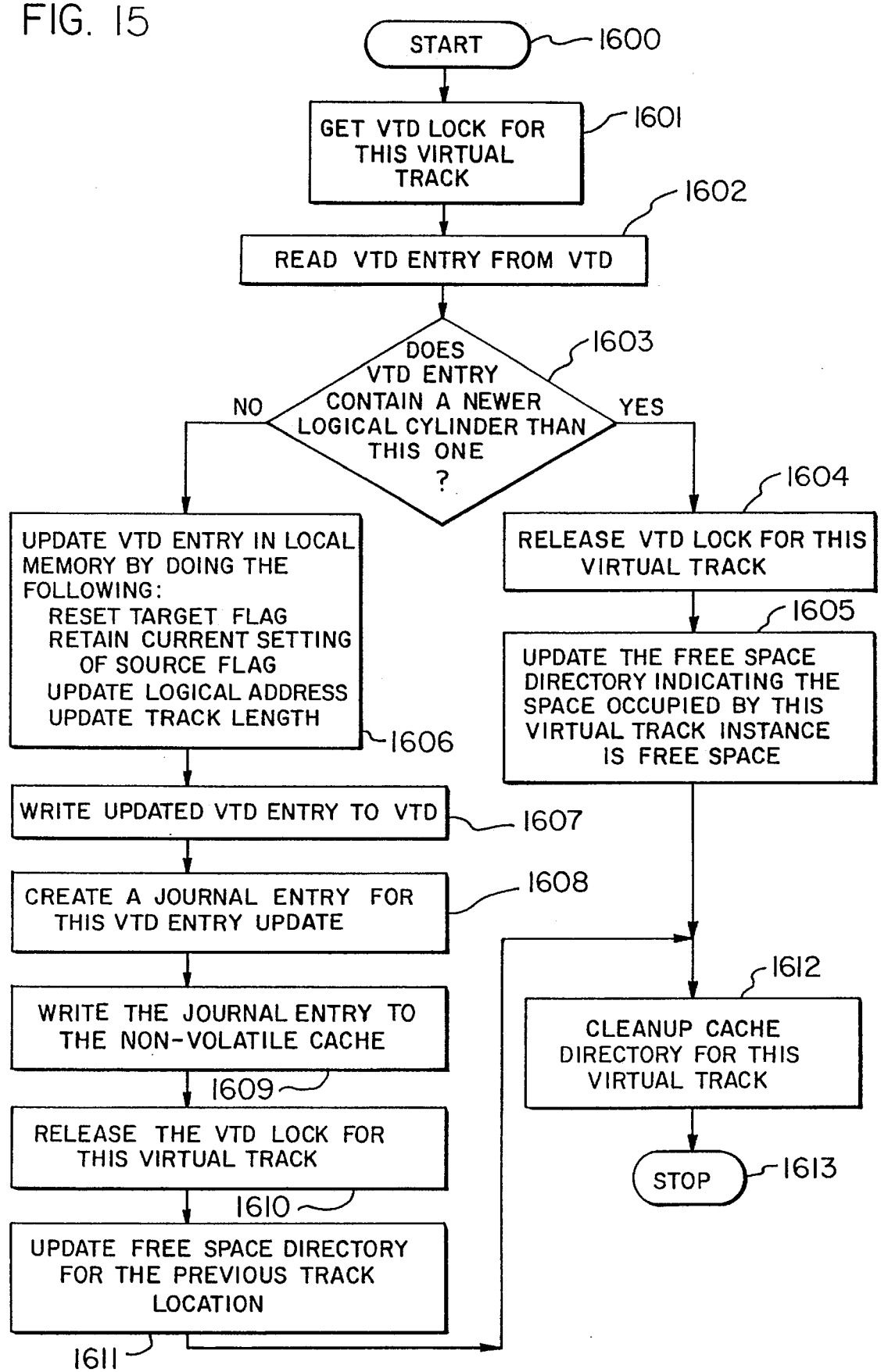

FIG. 15 illustrates in flow diagram the destaging process clean-up subroutine. This operation is analogous to the free space collection clean-up routine illustrated in FIG. 11. There is an almost one-to-one stepwise correspondence between these two processes with the exception that the destaging procedure does not contain a virtual track deleted determination as the flow chart of FIG. 11 has at step 1804. In addition, the destaging procedure includes step 1611 wherein the free space directory is updated to indicate that the previous virtual location of the virtual track that has been destaged is now available as free space. Furthermore, step 1612 has been included to clean-up the cache directory for this virtual track.

Data Set Delete

A further process operational in data storage subsystem 100 that can affect the integrity of the data stored therein is the data set delete process. The deleting of data sets must be performed under device lock control to allow the destaging and free space collection processes to operate without negatively affecting the integrity of the data stored in the data storage subsystem. Furthermore, the data set delete operation is journaled and recorded in a logical cylinder directory entry to allow a reconstruction of the virtual track directory in the case of a data loss. The flow chart illustrated in FIG. 12 is indicative of a typical operation of the data set delete process. The processes initiated at step 1600 and the track lock for this virtual track is set in the virtual track directory at step 1601. At step 1602, the entry for this virtual track is read from the virtual track directory and a corresponding logical cylinder directory entry is created to describe the virtual track deletion at step 1603. This logical cylinder directory entry contains the virtual address of the virtual track and an indicator to note the deleted status of this particular virtual track. The delete logical cylinder directory entry is written at step 1604 to the newest open logical cylinder in the open logical cylinder list. At step 1605, a corresponding journal entry containing the virtual address and the delete data set indicator is created and written at step 1606 into the non-volatile portion of cache memory 113. At step 1607 the entry in the virtual track directory contained in local memory is updated to indicate a deleted status of this virtual track and to provide data indicative of the logical address that contains the logical cylinder directory entry. At step 1608, the updated entry for this virtual track is written into the virtual track directory and the track lock for the virtual track directory is released at step 1609. Since a data set has been deleted, at step 1610 the free space directory is updated to indicate that the previous track location of this deleted virtual track is now available as free space and processing exits at step 1611.

SUMMARY

The use of multiple open logical cylinders in a dynamically mapped data storage subsystem for destaging virtual tracks requires careful management of the concurrently operating procedures within the data storage subsystem to avoid corrupting the data contained therein. The above described method manages these concurrently operational procedures to avoid the possibility of the concurrent processes operating in an overlapping fashion on one of the plurality of open logical cylinders.

If the processor determines that data can be destaged to more than one logical cylinder without a data integrity exposure, the process determines which logical cylinder to write the data to based on which of the open logical cylinders contains data which most closely matches the type of data to be destaged.

While a specific embodiment of this invention has been disclosed herein, it is expected that those skilled in the art can design other embodiments that differ from this particular embodiment but fall within the scope of the appended claims.

We claim:

1. A data storage subsystem for storing data records for a host processor, which is connected to said data storage subsystem, said data storage subsystem comprising:
  a plurality of data storage elements, a number of said data storage elements being configured into a plurality of redundancy groups, each redundancy group including n+m of said plurality of data storage elements, where n and m are both positive integers, with n greater than 1 and m greater than 0 and wherein each redundancy group is divided into a plurality of logical cylinders for storing data;
  control unit means comprising:
    at least one multipath storage director means for interconnecting said host processor with said data storage subsystem,
    cache memory means connected to and interconnecting said at least one multipath storage director means and said redundancy groups;
    processor means for maintaining a plurality of said logical cylinders concurrently open to write data from said cache memory means to a selected one of the plurality of concurrently open logical cylinders, wherein said processor is responsive to receipt of data records from said host processor, for selecting, independent of said host processor, available memory space in one of said plurality of concurrently open logical cylinders to store the received data records; and
    disk drive manager means for writing the received data records and data redundancy information for the received data records from said cache memory means into the selected available memory space.

2. The data storage subsystem of claim 1 wherein said processor means stores data which lists all of said plurality of concurrently open logical cylinders.

3. The data storage subsystem of claim 1 wherein said processor means stores data indicative of an amount of available memory space in each of said plurality of concurrently open logical cylinders.

4. The data storage subsystem of claim 1 comprising:
  wherein said control unit means is responsive to a subsequent receipt of modifications from said host processor to a previously stored data record stored in one of said redundancy groups, for writing, the modified data record in available memory space in one of said plurality of concurrently open logical cylinders; and
  said processor means converts memory space used to store said previously stored data record to available memory space.

5. The data storage subsystem of claim 1
  wherein said processor means stores data indicative of a correspondence between the received data records and respective redundancy groups in which each of said received data records is stored.

6. The data storage subsystem of claim 1
  wherein said processor means reserves at least one of said redundancy groups as archive redundancy groups, which archive redundancy groups are shared in common by all other ones of said redundancy groups.

7. The data storage subsystem of claim 6
  wherein said processor means migrates least used data records from said other ones of said redundancy groups to said archive redundancy groups.

8. The data storage subsystem of claim 1 wherein said processor means partitions said redundancy groups into at least two sets, with redundancy groups in said at least two sets having data storage characteristics which are a function of the number of data storage elements in a redundancy group and data storage capacity of said data storage elements in a redundancy group and media type of said data storage elements in a redundancy group.

9. The data storage subsystem of claim 8 wherein said processor means stores data indicative of which of said redundancy groups are assigned to each of said sets.

10. The data storage subsystem of claim 8 wherein said processor means identifies one of said sets as containing redundancy groups whose data storage characteristics match data storage characteristics of said received data records and wherein said data storage subsystem further comprises:

backend channel means, interconnecting said cache memory means and said disk drive manager means, for transmitting said received data record from said cache memory means to the selected one of said plurality of concurrently open logical cylinders in one of the redundancy groups contained in the identified one of said sets.

11. A method of storing data records in redundancy groups in a data storage system which is connected to a host processor via a processor interface and having a plurality of data storage elements for storing data thereon, a number of said data storage elements being configured into at least two redundancy groups, each redundancy group including n+m of said plurality of data storage elements, where n and m are both positive integers with n greater than 1 and m greater than 0, wherein each redundancy group is divided into a plurality of logical cylinders for storing data, and further including a cache memory connected to said processor interface and said redundancy groups, said method comprising the steps of:

maintaining a plurality of said logical cylinders concurrently open to write data from said cache memory to a selected one of the plurality of concurrently open logical cylinders;

selecting, in response to receipt of data records from said host processor, independent of said host processor, available memory space in one of said plurality of concurrently open logical cylinders to store the received data records; and writing the received data records and data redundancy information for said received data records in the selected available memory space.

12. The method of claim 11 wherein said step of maintaining comprises:

storing data which lists all of said plurality of concurrently open logical cylinders.

13. The method of claim 11 wherein said step of maintaining further comprises:

storing data indicative of an amount of available memory space in each of said plurality of concurrently open logical cylinders.

14. The method of claim 11 further comprising the steps of:

writing in response to a subsequent receipt of modifications from said host processor to a previously stored data record stored in one of said redundancy groups, the modified data record in available memory space in one of said plurality of concurrently open redundancy groups; and converting memory space used to store said previously stored data record to available memory space.

15. The method of claim 11 further comprising the step of:

maintaining data indicative of a correspondence between the received data records and respective redundancy groups in which each of said received data records is stored.

16. The method of claim 11 further comprising the step of:

reserving at least one of said redundancy groups as archive redundancy groups, which archive redundancy groups are shared in common by all other ones of said redundancy groups.

17. The method of claim 16 further comprising the step of:

migrating least used data records from said other ones of said redundancy groups to said archive redundancy groups.

18. The method of claim 11 further comprising the step of:

partitioning said redundancy groups into at least two sets, with redundancy groups in said at least two sets having data storage characteristics which are a function of the number of data storage elements in a redundancy group and data storage capacity of said data storage elements in a redundancy group and media type of said data storage elements in a redundancy group.

19. The method of claim 18 wherein said step of selecting comprises:

storing partitioning data indicative of which ones of said redundancy groups are assigned to each of said sets during said step of partitioning.

20. The method of claim 19 wherein said step of selecting further comprises:

identifying one of said sets as containing redundancy groups whose data storage characteristics match data storage characteristics of said received data records; and transmitting said received data records to the selected one of said concurrently open logical cylinders in one of the redundancy groups contained in the identified one of said sets.

* * * * *